US010388956B2

(12) United States Patent
Kobayashi et al.

(10) Patent No.: US 10,388,956 B2
(45) Date of Patent: Aug. 20, 2019

(54) CARBONACEOUS MOLDED ARTICLE FOR ELECTRODES AND METHOD OF MANUFACTURING THE SAME

(71) Applicant: Kureha Corporation, Tokyo (JP)

(72) Inventors: Shota Kobayashi, Tokyo (JP); Takanori Baba, Tokyo (JP); Hiroshi Imoto, Tokyo (JP); Mayu Komatsu, Tokyo (JP); Naohiro Sonobe, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 301 days.

(21) Appl. No.: 15/127,033

(22) PCT Filed: Mar. 20, 2015

(86) PCT No.: PCT/JP2015/058595
§ 371 (c)(1),
(2) Date: Sep. 19, 2016

(87) PCT Pub. No.: WO2015/141853
PCT Pub. Date: Sep. 24, 2015

(65) Prior Publication Data
US 2017/0110728 A1   Apr. 20, 2017

(30) Foreign Application Priority Data

Mar. 20, 2014 (JP) .................. 2014-059212
Mar. 20, 2014 (JP) .................. 2014-059213
Mar. 20, 2014 (JP) .................. 2014-059214

(51) Int. Cl.
H01M 4/13        (2010.01)
H01M 4/587       (2010.01)
H01M 4/04        (2006.01)
H01M 4/133       (2010.01)
H01M 4/1393      (2010.01)

(52) U.S. Cl.
CPC ......... H01M 4/587 (2013.01); H01M 4/0433 (2013.01); H01M 4/133 (2013.01); H01M 4/1393 (2013.01)

(58) Field of Classification Search
CPC .... H01M 4/587; H01M 4/0433; H01M 4/133; H01M 4/1393
See application file for complete search history.

(56) References Cited

U.S. PATENT DOCUMENTS

| | | | |
|---|---|---|---|
| 5,225,296 A | 7/1993 | Ohsawa et al. | |
| 5,951,959 A | 9/1999 | Nishimura | |
| 6,335,122 B1 | 1/2002 | Yamada et al. | |
| 7,572,553 B2 | 8/2009 | Ohkubo et al. | |
| 8,465,874 B2 | 6/2013 | Nishimura et al. | |
| 2006/0261504 A1 | 11/2006 | Simpson et al. | |
| 2007/0003837 A1 | 1/2007 | Nishimura et al. | |
| 2007/0054580 A1 | 3/2007 | Sakurai et al. | |
| 2007/0111101 A1 | 5/2007 | Ohkubo et al. | |
| 2013/0284558 A1 | 10/2013 | Kienzle et al. | |
| 2013/0316244 A1 | 11/2013 | Zhang et al. | |
| 2015/0024277 A1 | 1/2015 | Komatsu et al. | |
| 2015/0263347 A1 | 9/2015 | Imaji et al. | |

FOREIGN PATENT DOCUMENTS

| | | |
|---|---|---|
| EP | 2892096 A1 | 7/2015 |
| JP | H03163754 A | 7/1991 |
| JP | 7-22022 A | 1/1995 |
| JP | H08138651 A | 5/1996 |
| JP | H0992283 A | 4/1997 |
| JP | H09106807 A | 4/1997 |
| JP | H10116605 A | 5/1998 |
| JP | 10-284089 A | 10/1998 |
| JP | 2006-294316 A | 10/2006 |
| JP | 2007184127 A | 7/2007 |
| JP | 2009146580 A | 7/2009 |
| JP | 2012-151096 A | 8/2012 |
| JP | 2013544423 A | 12/2013 |
| JP | 2014-29848 A | 2/2014 |
| JP | 5619321 B2 | 11/2014 |
| TW | 331044 B | 5/1998 |
| TW | 200511631 A | 3/2005 |
| TW | 201338253 A | 9/2013 |
| WO | WO 98/44580 A1 | 10/1998 |

(Continued)

OTHER PUBLICATIONS

Notification of Reasons for Rejection dated Jul. 11, 2017, in Japanese Patent Application No. 2016-508842, with English translation.
Office Action dated Oct. 23, 2015, in Taiwan Patent Application No. 104109044, with English translation.
International Search Report of PCT/JP2015/058595 dated Jun. 16, 2015.
English Machine translation of Japanese Application No. 2009-146580, published Jul. 2, 2009.
International Preliminary Report on Patentability and Written Opinion of the International Searching Authority (forms PCT/IB/373, PCT/ISA/237, PCT/IB/338 and PCT/IB/326), dated Oct. 12, 2017, for International Application No. PCT/JP2016/059832, with an English translation of the Written Opinion.

(Continued)

Primary Examiner — Jane J Rhee
(74) Attorney, Agent, or Firm — Birch, Stewart, Kolasch & Birch, LLP

(57) ABSTRACT

An object of the present invention is to provide a carbonaceous molded article for electrodes having high charge/discharge capacity, high initial charge/discharge efficiency, and excellent cycle life without a polymeric binder.
The above object can be achieved by the carbonaceous molded article for electrodes of the present invention comprising a carbon fiber nonwoven fabric, the article having a thickness of not greater than 1 mm, an atomic ratio (H/C) of hydrogen atoms and carbon atoms according to elemental analysis of not greater than 0.1, a porosity determined from a bulk density and a butanol true density of the molded article of 25 to 80%, and a volatile content of not greater than 5.0 wt %.

17 Claims, No Drawings

(56) References Cited

FOREIGN PATENT DOCUMENTS

| WO | WO 2010/134465 A1 | 11/2010 |
|----|-------------------|---------|
| WO | WO 2013/118757 A1 | 8/2013  |
| WO | WO 2015/033827 A1 | 3/2015  |

OTHER PUBLICATIONS

Notification of Reasons for Rejection, dated Oct. 3, 2017, for Japanese Patent Application No. 2017-509952, with English translation.
U.S. Office Action, dated Feb. 20, 2018, for U.S. Appl. No. 15/562,152.
U.S. Office Action, dated May 31, 2018, for U.S. Appl. No. 15/562,152.
U.S. Office Action, dated Oct. 10, 2018, for U.S. Appl. No. 15/562,152.

CARBONACEOUS MOLDED ARTICLE FOR ELECTRODES AND METHOD OF MANUFACTURING THE SAME

TECHNICAL FIELD

The present invention relates to a carbonaceous molded article for electrodes and a method for manufacturing such an article.

A secondary battery having excellent durability may be obtained by the present invention.

In particular, a secondary battery having high charge/discharge efficiency and high discharge capacity may be obtained by a carbonaceous molded article for electrodes comprising a non-graphitizable carbonaceous material.

Furthermore, a non-aqueous solvent secondary battery having excellent charge/discharge capacity and charge/discharge efficiency may be obtained by a carbonaceous molded article for electrodes comprising a graphitizable carbonaceous material.

Additionally, electrode density may be increased and a secondary battery having high discharge capacity per unit volume may be obtained by a carbonaceous molded article for electrodes comprising a metal or a metal compound.

BACKGROUND ART

Recently, in the application of non-aqueous electrolyte secondary batteries to a small portable device such as mobile telephones or laptop computers, the capacity per unit volume is important, and therefore graphitic materials with primarily large density have been used as anode active materials.

On the other hand, the notion of mounting large lithium-ion secondary batteries, having high energy density and excellent output characteristics, in electric vehicles has been investigated in response to increasing concern over environmental issues. However, lithium-ion secondary batteries for vehicles are large and expensive, and are thus difficult to replace.

Therefore, the lithium-ion secondary batteries for vehicles are required to have at least the same durability as that of the vehicles and demanded to have a product life of 10 years or longer (high durability).

Not only are high-performance lithium-ion secondary batteries used as power sources in small portable devices and next-generation vehicles such as electric and hybrid vehicles, they are also used in energy storage for power peak shifting and renewable energy stabilization.

That is, lithium-ion secondary batteries are used in a variety of applications, and therefore the required performance of a lithium-ion secondary battery differs greatly depending on application.

When applications are classified according to the scale of lithium-ion secondary battery, four typical applications are considered: "system," "industrial," "medium-scale grid," and "residential."

"System" applications include cases where lithium-ion secondary batteries are installed in a large-scale solar photovoltaic power plant (so-called megasolar), a wind power station, or the like, and cases where they are installed in a substation or the like. In "industrial" applications, lithium-ion secondary batteries are installed in factories, commercial facilities, large-scale housing complexes, or the like, or are used for excess power storage of renewable energy or storage for power peak shifting.

In "medium-scale grid" applications, lithium-ion secondary batteries are installed in schools, urban areas, buildings, or housing complexes.

In "residential" applications, small storage batteries are installed in individual residences.

In such lithium-ion secondary battery applications, further cost reduction, extension of lifetime, increased energy density, and the like are required.

The following manufacturing method has been widely used for producing anodes of conventional general lithium-ion secondary batteries.

A binder is added to an anode active material and dissolved with an organic solvent or water.

Additives such as a conductive agent are added as necessary, and the obtained mixture is kneaded to form a slurry.

One or both faces of a metal foil current collector made from copper, nickel, or the like is coated with this slurry by a method such as doctor blading.

This is dried, and then made into an electrode by pressing.

Then, the obtained electrode is cut to a prescribed width and length, and laminated together with a cathode and a separator, and then an electrolyte is added, to produce a lithium-ion secondary battery.

As described above, lithium-ion secondary batteries are used not only as power supplies of small portable devices but in vehicular applications as well. Additionally, large lithium-ion secondary batteries are also widely used in load leveling applications through power storage.

In the field of small portable devices, the demand for high capacity, high durability, and reduced manufacturing cost gets stronger as devices increase in functionality.

On the other hand, in the field of large-scale batteries, the demand for high durability, high reliability, and reduced manufacturing cost is strong.

To satisfy such requirements for lithium-ion secondary batteries, high charge/discharge capacity, high coulombic efficiency, high durability, reduced electrode resistance, and reduced cost are anticipated in anode materials.

Manufacturing an anode in a lithium-ion secondary battery, as described above, includes an active material slurry production step, a step of coating a current collector, a drying step, and a compression molding step.

That is, it requires expensive manufacturing equipment and complex processes. Additionally, the uniformity of electrode coating greatly affects variations in battery performance. Furthermore, the speed of the coating step and drying step greatly affects battery manufacturing capacity.

Therefore, if the electrode production process in the battery manufacturing process could be simplified, not only would quality stability and battery productivity be improved, but reduced battery manufacturing cost could also be expected.

CITATION LIST

Patent Literature

Patent Document 1: Japanese Unexamined Patent Application Publication No. H9-92283A
Patent Document 2: Japanese Unexamined Patent Application Publication No. H10-116605A
Patent Document 3: Japanese Unexamined Patent Application Publication No. 2009-146580A
Patent Document 4: Japanese Unexamined Patent Application Publication No. H8-138651A

SUMMARY OF INVENTION

Technical Problem

Conventional lithium-ion secondary batteries have the problems that charge/discharge capacity is low, initial charge/discharge efficiency is low, charge/discharge speed is slow, and cycle life is short.

To solve these problems, Patent Document 1 discloses that a paper-like lithium secondary battery is obtained by using short carbon fibers as a framework and filling the spaces between the fibers with a powdered carbon material such as milled carbon fibers.

However, the obtained anode are composed of polyester fibers, polyethylene fibers, PET fibers, or the like as a binder, and it is thought that these binders swell up due to the electrolyte.

Furthermore, Patent Document 2 discloses an anode material wherein a solution of a carbon sheet dissolved in an organic solvent is impregnated with a thermosetting resin, and by curing, the carbon fiber surface is coated with the thermosetting resin, and then the carbon fiber surface is coated with a carbide of the thermosetting resin by carbonizing at 2000 to 3000° C. in a non-oxidizing atmosphere. However, the anode comprising this anode material include polyvinylidene fluoride powder as a binder, and it is thought that this binder swells up due to the electrolyte. Additionally, a secondary battery comprising the obtained anode does not have sufficient discharge capacity or sufficient efficiency.

Patent Document 3 discloses an anode active material sheet for a lithium-ion secondary battery having carbonaceous particles that dope and dedope lithium ions and a heat treated carbonized material that binds the carbonaceous particles. However, the obtained active material sheet has a low charge/discharge capacity of a maximum of 101 mAh/g, and coulombic efficiency, which is determined by dividing the discharge capacity by the charge capacity, is a very low 30%. That is, the basic charge/discharge performance of the anode according to Patent Document 3 is low.

Additionally, Patent Document 4 discloses a carbonaceous molded article obtained by impregnating curved carbon fibers with a matrix resin, molding and then performing heat treatment in a non-oxidizing atmosphere.

However, the discharge capacity is not higher than 200 mAh/g, and the quantity of electricity that can be charged/discharged is small.

An object of the present invention is to provide a carbonaceous molded article for electrodes having high charge/discharge capacity, high initial charge/discharge efficiency, and excellent cycle life without containing a polymeric binder. Specifically, an object of the present invention is to provide a carbonaceous molded article for electrodes having high electrical conductivity as an anode for a battery, without containing a polymeric binder that causes swelling of the electrode due to the electrolyte.

Another object of the present invention is to provide an efficient method for manufacturing an anode.

Solution to Problem

As a result of diligent research on carbonaceous molded articles for electrodes having high charge/discharge capacity, high initial charge/discharge efficiency, and excellent cycle life without containing a polymeric binder, the present inventors unexpectedly discovered that a carbonaceous molded article for electrodes containing a carbon fiber nonwoven fabric having specified physical properties, particularly ionic conductivity, and having a porosity of 25 to 80% and a nonvolatile component content of not greater than 5 wt % exhibits excellent coulombic efficiency. The present invention is based on such knowledge.

Thus, the present invention relates to:

[1] A carbonaceous molded article for electrodes comprising a carbon fiber nonwoven fabric, the article having a thickness of not greater than 1 mm, an atomic ratio (H/C) of hydrogen atoms and carbon atoms according to elemental analysis of not greater than 0.1, a porosity determined from a bulk density and a butanol true density of the molded article of 25 to 80%, and a volatile content of not greater than 5.0 wt %;

[2] The carbonaceous molded article for electrodes according to [1], wherein the article comprises non-graphitizable carbon;

[3] The carbonaceous molded article for electrodes according to [1] or [2], wherein the article comprises graphitizable carbon;

[4] The carbonaceous molded article for electrodes according to any one of [1] to [3], wherein the article comprises one or more anode active materials selected from the group consisting of metals capable of lithium doping and dedoping and metal compounds capable of lithium doping and dedoping;

[5] The carbonaceous molded article for electrodes according to any one of [1] to [4], wherein the carbonaceous molded article has a true density of 1.4 to 2.20 $g/cm^3$;

[6] The carbonaceous molded article for electrodes according to any one of [1] to [4], wherein the carbonaceous molded article has a true density of not less than 1.4 and less than 1.85 $g/cm^3$;

[7] The carbonaceous molded article for electrodes according to any one of [1] to [5], wherein the carbonaceous molded article has a true density of 1.85 to 2.20 $g/cm^3$;

[8] The carbonaceous molded article for electrodes according to any one of [1] to [7], wherein at least one combustion peak is observed at not higher than 760° C. as measured by a differential thermal analyzer;

[9] The carbonaceous molded article for electrodes according to any one of [1] to [8], wherein carbon fibers of the carbon fiber nonwoven fabric have an isotropic structure;

[10] An electrode for batteries comprising the carbonaceous molded article for electrodes described in any one of [1] to [9];

[11] A non-aqueous electrolyte secondary battery comprising the electrode for batteries described in [10];

[12] A method of manufacturing a carbonaceous molded article for electrodes, the method comprising:

(1) an impregnation step of impregnating a carbon fiber nonwoven fabric with a slurry containing a carbonaceous material precursor dispersed in a solvent, and obtaining an anode active material precursor impregnated carbon fiber nonwoven fabric, (2) a molding step of molding the anode active material precursor impregnated carbon fiber nonwoven fabric, and obtaining a molded article, and (3) a heat treatment step of heat treating the molded article at 1000° C. to 2000° C. in a non-oxidizing gas atmosphere;

[13] A method of manufacturing a carbonaceous molded article for electrodes, the method comprising: (1) an impregnation step of impregnating a carbon fiber precursor nonwoven fabric with a slurry containing a carbonaceous material precursor dispersed in a solvent, and obtaining an anode active material precursor impregnated carbon fiber precursor nonwoven fabric, (2) a molding step of molding the anode active material precursor impregnated carbon fiber precursor nonwoven fabric, and obtaining a molded article, and (3) a heat treatment step of heat treating the molded article at 1000° C. to 2000° C. in a non-oxidizing gas atmosphere;

[14] The method of manufacturing a carbonaceous molded article for electrodes according to [12] or [13], wherein the carbonaceous material precursor is at least one selected from the group consisting of a non-graphitizable carbonaceous material precursor and a graphitizable carbonaceous material precursor;

[15] The method of manufacturing a carbonaceous molded article for electrodes according to any one of [12] to [14], wherein the slurry contains one or more anode active materials selected from the group consisting of metals capable of lithium doping and dedoping and metal compounds capable of lithium doping and dedoping;

[16] The method of manufacturing a carbonaceous molded article for electrodes according to any one of [12] to [15], wherein the molded article in the molding step (2) is obtained by compression molding;

[17] The method of manufacturing a carbonaceous molded article for electrodes according to any one of [12] to [16], wherein carbon fibers of the carbon fiber nonwoven fabric have an isotropic structure.

Advantageous Effects of Invention

In an electrode containing a polymeric binder, swelling occurs due to the electrolyte and contact resistance between particles increases due to the swelling of the polymeric binder, and as a result, the resistance of the electrode increases.

The carbonaceous molded article for electrodes of the present invention contains nearly no polymeric binder having low electrical conductivity.

Therefore, by using the carbonaceous molded article for electrodes of the present invention as an anode material of, for example, a non-aqueous solvent secondary battery (e.g., a lithium ion secondary battery), an increase in overvoltage caused by contact resistance of active material particles can be suppressed.

Furthermore, because contact resistance does not increase, charging/discharging with high current density are possible without the overvoltage of the electrode increasing. Additionally, because the overvoltage does not rise, safety is increased without decomposition or heat build-up of the electrolyte.

There is also a possibility that the binder will swell up and separate from the current collector due to the non-aqueous solvent that constitutes the electrolyte.

However, since the carbonaceous molded article for electrodes of the present invention does not contain a polymeric binder, excellent durability can be obtained without swelling.

Additionally, with the carbonaceous molded article of the present invention, by controlling the structure of the particles that constitute the carbonaceous molded article and the porosity of the carbonaceous molded article, it is possible to obtain a non-aqueous solvent secondary battery having high discharge capacity relative to charge capacity and low irreversible capacity, and therefore having high charge/discharge efficiency.

Furthermore, by using the carbonaceous molded article of the present invention as an anode material, the process of coating the electrode current collector with the active material, which requires high skill, becomes unnecessary and therefore the battery manufacturing process can be simplified.

Also, by the carbonaceous molded article for electrodes comprising a non-graphitizable carbonaceous material of the present invention, a secondary battery having high discharge capacity per unit weight may be obtained.

Additionally, the carbonaceous molded article for electrodes comprising a graphitizable carbonaceous material of the present invention allows electrode density to increase and yields a secondary battery having high discharge capacity per unit volume.

Furthermore, a secondary battery that employs the carbonaceous molded article for electrodes comprising a metal or the like capable of lithium doping and dedoping of the present invention has extremely high charge/discharge capacity.

Also, the carbonaceous molded article for electrodes of the present invention may also be used in batteries other than non-aqueous solvent secondary batteries, and when used in, for example, an all-solid-state secondary battery, the same effects as in a non-aqueous solvent secondary battery may be obtained.

The metal or metal compound capable of lithium doping and dedoping readily expand and contracts due to charging and discharging, but this swelling and contraction can be suppressed in the carbonaceous molded article for electrodes of the present invention, and it can be used as an electrode demonstrating safety and excellent charge/discharge capacity and efficiency.

DESCRIPTION OF EMBODIMENTS

[1] Carbonaceous Molded Article for Electrodes

The carbonaceous molded article for electrodes of the present invention is a carbonaceous molded article for electrodes comprising a carbon fiber nonwoven fabric, the article having a thickness of not greater than 1 mm, an atomic ratio (H/C) of hydrogen atoms and carbon atoms according to elemental analysis of not greater than 0.1, a porosity determined from a bulk density and a butanol true density of the molded article of 25 to 80%, and a volatile content of not greater than 5.0 wt %. In the carbonaceous molded article for electrodes of the present invention, preferably, the true density is from 1.4 to 2.20 g/cm$^3$, or the true density may be not less than 1.4 and less than 1.85 g/cm$^3$, or the true density may be from 1.85 to 2.20 g/cm$^3$.

Furthermore, the carbonaceous molded article for electrodes of the present invention preferably has at least one combustion peak at not higher than 760° C. as measured by differential thermal analysis.

Also, the carbonaceous molded article for electrodes of the present invention preferably comprises a non-graphitizable carbonaceous material and/or a graphitizable carbonaceous material.

Additionally, the carbonaceous molded article for electrodes of the present invention may comprise one or more anode active materials selected from the group consisting of metals capable of lithium doping and dedoping and metal compounds capable of lithium doping and dedoping.

In the present specification, "amorphous carbon" or "turbostratic structure carbon" means non-graphitizable carbon and graphitizable carbon.

That is, in the present specification, non-graphitic material that does not have a graphite structure is called amorphous carbon or turbostratic structure carbon.

Thickness of Carbonaceous Molded Article

The thickness of the carbonaceous molded article of the present invention is not greater than 1 mm.

When the carbonaceous molded article is thick, when used as an anode, the distance from the molded article surface to the current collector is large, which leads to increased electrode resistance.

Therefore, the upper limit of molded article thickness is not greater than 1 mm, preferably not greater than 0.8 mm, and more preferably not greater than 0.7 mm. On the other hand, the thinner the carbonaceous molded article, the lower the electrode resistance, and this enables rapid charge/discharge. Therefore, the lower limit of molded article thickness is not limited.

However, when the thickness of the carbonaceous molded article is thin, the used amounts of current collector and separator increase, and the volume energy density of the non-aqueous solvent secondary battery may decrease.

Therefore, the lower limit of molded article thickness is not less than 0.01 mm, preferably not less than 0.1 mm, and more preferably not less than 0.2 mm.

Bulk Density of Carbonaceous Molded Article

The bulk density of the carbonaceous molded article of the present invention is not particularly limited, but is preferably from 0.20 to 1.40 g/cm$^3$, more preferably from 0.30 to 1.40 g/cm$^3$, even more preferably from 0.30 to 1.30 g/cm$^3$, and most preferably from 0.40 to 1.30 g/cm$^3$.

A bulk density of 0.20 to 1.40 g/cm$^3$ results in a carbonaceous molded article having high charge/discharge efficiency.

The bulk density of the carbonaceous molded article comprising a metal capable of lithium doping and dedoping or metal compound capable of lithium doping and dedoping is not particularly limited, but is preferably from 0.20 to 2.25 g/cm$^3$, more preferably from 0.30 to 2.25 g/cm$^3$, even more preferably from 0.35 to 2.20 g/cm$^3$, and most preferably from 0.40 to 2.20 g/cm$^3$.

A bulk density of 0.20 to 2.25 g/cm$^3$ results in a molded article having excellent charge/discharge efficiency.

The bulk density of the carbonaceous molded article is the value obtained by dividing the mass of the carbonaceous molded article by the volume (area×thickness) determined from the exterior dimensions of the carbonaceous molded article. That is, the bulk density of the carbonaceous molded article means the mass per unit volume including open pores (cavities that pass through to the exterior) and closed pores (cavities insolated in the interior).

When the bulk density is less than 0.20 g/cm$^3$, the quantity of electricity that can be stored per unit volume may decrease.

Specific Surface Area of Carbonaceous Molded Article

The specific surface area (also called "SSA" hereinafter) determined by the BET method of nitrogen adsorption of the carbonaceous molded article of the present invention is not particularly limited, but is preferably from 0.01 to 20 m$^2$/g. The upper limit of specific surface area is preferably not greater than 15 m$^2$/g, more preferably not greater than 10 m$^2$/g, and most preferably not greater than 5 m$^2$/g. When the SSA is greater than 20 m$^2$/g, the irreversible capacity of the obtained battery may be large.

Furthermore, the lower limit of specific surface area is preferably not less than 0.05 m$^2$/g, more preferably not less than 0.1 m$^2$/g, and most preferably not less than 0.5 m$^2$/g. When the SSA is less than 0.01 m$^2$/g, the discharge capacity of the obtained battery may be small.

Atomic Ratio (H/C) of Carbonaceous Molded Article

The H/C ratio of the carbonaceous molded article of the present invention can be calculated from the values of hydrogen atom content and carbon atom content measured by elemental analysis.

As the degree of carbonization of a carbonaceous material increases, the hydrogen content decreases and thus the H/C ratio tends to decrease.

Accordingly, the H/C ratio is effective as an index expressing the degree of carbonization.

The H/C ratio of the carbonaceous molded article of the present invention is not greater than 0.1, more preferably not greater than 0.08, and even more preferably not greater than 0.05.

When the H/C ratio of hydrogen atoms to carbon atoms exceeds 0.1, the amount of functional groups present in the carbonaceous material increases, and the irreversible capacity increases due to a reaction with lithium.

True Density of Carbonaceous Molded Article

The true density of a molded article having an ideal graphite structure is 2.2 g/cm$^3$, and the true density tends to decrease as the crystal structure becomes disordered. Therefore, the true density can be used as an index expressing the carbon structure. The true density of the carbonaceous molded article of the present invention is preferably from 1.4 to 2.20 g/cm$^3$, and the lower limit is more preferably not less than 1.45 g/cm$^3$, even more preferably not less than 1.50 g/cm$^3$, yet more preferably not less than 1.55 g/cm$^3$, and yet more preferably not less than 1.56 g/cm$^3$.

Furthermore, the upper limit of the true density is preferably not greater than 2.20 g/cm$^3$, more preferably not greater than 2.15 g/cm$^3$, and even more preferably not greater than 2.10 g/cm$^3$.

A carbonaceous molded article having a true density of less than 1.4 g/cm$^3$ may have a large number of closed pores, and the doping and dedoping capacity may be reduced, which is not preferable.

Furthermore, the electrode density decreases and thus causes a decrease in the volume energy density, which is not preferable.

Furthermore, when the true density exceeds 2.20 g/cm$^3$, the crystallinity of the carbonaceous molded article increases, while the proportion of edge surfaces decreases, and the input/output performance decreases.

Also, when the true density exceeds 2.20 g/cm$^3$, the high-temperature cycle characteristics may be inferior when the carbonaceous molded article of the present invention is used in a battery.

Furthermore, the true density of a carbonaceous molded article comprising a large amount of non-graphitizable carbonaceous material is preferably not less than 1.4 and less than 1.85 g/cm$^3$, and the lower limit is more preferably not less than 1.45 g/cm$^3$, even more preferably not less than 1.50 g/cm$^3$, yet more preferably not less than 1.55 g/cm$^3$, and yet more preferably not less than 1.56 g/cm$^3$.

Also, the upper limit of the true density of a carbonaceous molded article containing a large amount of non-graphitizable carbonaceous material is less than 1.85 g/cm$^3$, more preferably not greater than 1.70 g/cm$^3$, and even more preferably not greater than 1.60 g/cm$^3$.

The carbonaceous molded article of the present invention having a true density of not less than 1.4 and less than 1.85 g/cm$^3$ can achieve a high discharge capacity per unit weight.

Also, the true density of a carbonaceous molded article containing a large amount of graphitizable carbonaceous material is preferably from 1.85 to 2.20 g/cm$^3$, and the lower limit is preferably not less than 1.88 g/cm$^3$, and more preferably not less than 1.90 g/cm$^3$.

Furthermore, the upper limit of the true density of a carbonaceous molded article containing a large amount of graphitizable carbonaceous material is not greater than 2.20 g/cm$^3$, more preferably not greater than 2.15 g/cm$^3$, and even more preferably not greater than 2.10 g/cm$^3$.

With the carbonaceous molded article of the present invention having a true density of 1.85 to 2.20 g/cm$^3$, electrode density can be increased and a secondary battery having high discharge capacity per unit volume may be obtained.

Furthermore, in a carbonaceous molded article comprising a metal capable of lithium doping and dedoping or metal compound capable of lithium doping and dedoping, true density serves as an index indicating the structure of the metal or metal compound. The true density of the carbonaceous molded article of the present invention is measured as the mean value of the materials that constitute the molded article.

The porosity of the molded article is greatly affected by doping and dedoping of lithium but can be calculated from the bulk density and true density of the molded article, and in that sense, true density serves as an index indicating the characteristics of the carbonaceous molded article.

The lower limit of true density of a carbonaceous molded article comprising the above metal or metal compound is not particularly limited, but is not less than 1.51 g/cm$^3$, preferably not less than 1.70 g/cm$^3$, more preferably not less than 1.80 g/cm$^3$, and even more preferably not less than 1.90 g/cm$^3$.

A carbonaceous molded article having a true density of less than 1.51 g/cm$^3$ may have a large number of closed pores, and the doping and dedoping capacity may be reduced, which is not preferable.

Furthermore, the electrode density decreases and thus causes a decrease in the volume energy density, which is not preferable.

Furthermore, the upper limit of true density of a carbonaceous molded article comprising the above metal or metal compound is not particularly limited, but is not greater than 3.00 g/cm$^3$, preferably not greater than 2.90 g/cm$^3$, and even more preferably not greater than 2.80 g/cm$^3$.

If the upper limit is greater than 3.00 g/cm$^3$, the proportion of metal or metal compound capable of doping and dedoping lithium is high and the metal expansion/contraction is large, and durability may decrease.

As the method of measuring true density, there are a pycnometer method using butanol and a method of measuring a dry density using helium, but the true density of the carbonaceous molded article in the present specification means true density obtained by the pycnometer method using butanol.

When the carbonaceous molded article of the present invention is constituted by a plurality of carbon materials having different structures, the respective carbon materials exhibit different true densities due to the differences in their structures. However, as the true density of the carbonaceous molded article of the present invention, the value of true density measured by the pycnometer method using the molded article as a whole is taken to be the true density of the molded article even if a mixture of carbon materials of different structures are present in the carbonaceous molded article.

Porosity of Carbonaceous Molded Article

The porosity of the carbonaceous molded article of the present invention is from 25 to 80% and preferably from 30 to 75%, and in certain aspects, it is preferably from 30 to 80%, more preferably from 38 to 80%, and even more preferably from 38 to 75%. Furthermore, the porosity of the carbonaceous molded article of the present invention comprising a metal capable of lithium doping and dedoping or metal compound capable of lithium doping and dedoping is also from 25 to 80%, but is preferably from 28 to 70% and more preferably from 30 to 60%.

Additionally, in certain aspects, the porosity of the carbonaceous molded article of the present invention is from 25 to 50% and preferably from 25 to 40%.

In addition, in certain aspects, the porosity is from 50 to 80% and preferably from 60 to 80%.

The cavities in the carbonaceous molded article of the present invention are filled with electrolyte when the carbonaceous molded article is used as a non-aqueous electrolyte secondary battery.

When the porosity is low, the movement speed of lithium ions in the electrolyte may decrease and ionic conductivity may decrease.

On the other hand, when the porosity is too high, it is not preferable because the strength of the electrode molded article decreases and the volume energy density of the molded article as an electrode decreases.

The pore volume of the carbonaceous molded article of the present invention is not particularly limited.

However, the pore volume of pores 0.05 to 100 µm in diameter is preferably from 0.27 to 1.0 mL/g.

When the pore volume of pores 0.05 to 100 µm in diameter is low, the movement speed of lithium ions in the electrolyte may decrease and ionic conductivity may decrease.

On the other hand, when the pore volume of pores 0.05 to 100 µm in diameter is too high, it is not preferable because the strength of the electrode molded article decreases and volume energy density of the molded article as an electrode decreases. Basically, the porosity and the pore volume of pores 0.05 to 100 µm in diameter correlate with each other.

Furthermore, since the pore volume of pores 0.01 to 0.05 µm in diameter in the carbonaceous molded article of the present invention is extremely low, the lower limit is not limited, but the upper limit is preferably not greater than 0.1 mL/g, more preferably not greater than 0.05 mL/g, and even more preferably not greater than 0.01 mL/g.

Volatile Content of Carbonaceous Molded Article

The volatile content of the carbonaceous molded article of the present invention is not greater than 5 wt %, preferably not greater than 4 wt %, and more preferably not greater than 3 wt %.

Because conductivity of a carbon material increases as volatile content decreases, the amount of volatile content can be used as an index of conductivity of a carbonaceous molded article.

Furthermore, when a polymeric binder having low conductivity is used, a large amount of volatile content is detected, and therefore the content ratio of polymeric binder may be measured by measuring the amount of volatile content.

Differential Thermal Analysis of Carbonaceous Molded Article

The carbonaceous molded article of the present invention preferably has at least one combustion peak at not higher than 760° C. as measured by differential thermal analysis, although it is not limited.

An exothermic peak as measured by differential thermal analysis correlates with the heat treatment temperature of the carbonaceous molded article of the present invention. A carbonaceous molded article heat treated at not higher than 2000° C. has a combustion peak at not higher than 760° C., and when the heat treatment temperature is lower, the combustion peaks of differential thermal analysis are also lower.

The combustion peak by differential thermal analysis of the carbonaceous molded article of the present invention is preferably not higher than 750° C., more preferably not higher than 740° C., even more preferably not higher than 730° C., yet more preferably not higher than 720° C., yet more preferably not higher than 710° C., and yet more preferably not higher than 700° C.

Heat Treatment Temperature of Carbonaceous Molded Article

The carbonaceous molded article of the present invention is not particularly limited, but is preferably obtained by heat treatment at 1000 to 2000° C.

In particular, the carbonaceous molded article comprising a metal capable of lithium doping and dedoping and/or a metal compound capable of lithium doping and dedoping is preferably obtained by heat treatment at a temperature of 1000 to 2000° C. The lower limit of the heat treatment temperature is preferably 1050° C., more preferably not less than 1100° C., and even more preferably not less than 1150° C. By heat treatment at 1000 to 2000° C., the optimal H/C ratio is obtained, and an increase in irreversible capacity due to a reaction with lithium can be suppressed. Furthermore, heat treatment at the above temperature can prevent the selective orientation of the carbon hexagonal plane from becoming too high, and can prevent discharge capacity from decreasing.

Average Interlayer Spacing of Carbonaceous Molded Article

The average interlayer spacing of the (002) plane determined by powder X-ray diffraction on the carbonaceous material that is one of the constituent materials of the carbonaceous molded article of the present invention exhibits a value that decreases as crystal perfection increases. The average interlayer spacing of an ideal graphite structure exhibits a value of 0.3354 nm, and the value tends to increase as disorder of the structure increases.

Therefore, the average interlayer spacing is effective as an index indicating the carbon structure.

The average interlayer spacing of the (002) plane of the turbostratic structure carbon contained in the carbonaceous molded article of the present invention is not limited, but is not less than 0.336 nm, preferably not less than 0.340 nm, more preferably not less than 0.345 nm, and even more preferably not less than 0.365 nm.

In particular, the average interlayer spacing of the (002) plane of a carbonaceous molded article comprising a metal capable of lithium doping and dedoping and/or a metal compound capable of lithium doping and dedoping is not less than 0.336 nm, preferably not less than 0.340 nm, more preferably not less than 0.345 nm, and even more preferably not less than 0.365 nm.

The upper limit of average interlayer spacing is not greater than 0.400 nm, preferably not greater than 0.395 nm, and more preferably not greater than 0.390 nm.

In particular, the average interlayer spacing of the (002) plane of a carbonaceous molded article comprising a metal capable of lithium doping and dedoping and/or a metal compound capable of lithium doping and dedoping is not greater than 0.400 nm, preferably not greater than 0.395 nm, and more preferably not greater than 0.390 nm. If the interlayer spacing of the (002) plane is less than 0.340 nm, when the carbonaceous material is used as an anode of a non-aqueous electrolyte secondary battery, doping capacity will be small or repeating properties will be poor because expansion and contraction involving doping and dedoping of lithium become large and thus the electric conductivity network among the particles is cut off due to voids between the particles. Therefore, such a carbonaceous material is not, in particular, preferable for use in automobiles.

Furthermore, if the interlayer spacing of the (002) plane exceeds 0.400 nm, irreversible capacity will be large, which is not preferable.

Anode Active Material

The carbonaceous molded article for non-aqueous electrolyte secondary battery electrodes of the present invention preferably comprises turbostratic structure carbon (amorphous carbon) as the anode active material.

Furthermore, the carbonaceous molded article comprises carbon fiber nonwoven fabric, but this carbon fiber nonwoven fabric also functions as an anode active material. Additionally, the carbonaceous molded article may comprise one or more anode active materials selected from the group consisting of metals or metal compounds capable of lithium doping and dedoping, and may also comprise graphitic materials as necessary.

Carbon Fiber Nonwoven Fabric

The carbon fiber nonwoven fabric contained in the carbonaceous molded article of the present invention is a nonwoven fabric comprising carbon fibers and is not limited as long as it can be impregnated with an anode active material, but may be, for example, carbon fiber paper or carbon fiber felt, and is preferably carbon fiber paper. Furthermore, the carbon fiber nonwoven fabric may have an isotropic structure or anisotropic structure, but preferably has an isotropic structure.

The carbon fiber nonwoven fabric contained in the carbonaceous molded article functions as an anode material itself, and can be doped and dedoped with lithium.

That is, the carbon fibers used in the carbon fiber nonwoven fabric are carbon fibers that can be doped and dedoped with lithium.

Therefore, the carbon fibers can function as an anode active material.

In other words, the carbon fiber capable of lithium doping and dedoping used in the present invention are considered to be ion conductors.

In the present invention, due to the carbon fiber nonwoven fabric functioning as an anode active material, it is possible to obtain a non-aqueous solvent secondary battery having high discharge capacity relative to charge capacity and low irreversible capacity, and therefore high charge/discharge efficiency.

The average fiber length of the carbon fibers contained in the carbon fiber nonwoven fabric is not particularly limited but is preferably from 1 to 30 mm, more preferably from 1 to 20 mm, and even more preferably from 1 to 10 mm. When the average fiber length of the carbon fibers is less than 1 mm, there are many fibers that slip stitches during the manufacture of the carbon fiber nonwoven fabric, and the yield of the carbon fiber nonwoven fabric may decrease. When the average fiber length of the carbon fibers is greater than 30 mm, dispersion in the dispersion step becomes poor and lumps are produced, which may result in lower quality. The average fiber diameter of the carbon fibers is preferably from 0.5 to 30 μm, and more preferably from 1 to 20 μm. When the average fiber diameter of the carbon fibers is less than 1 μm, manufacturing cost may increase. When the average fiber diameter of the carbon fibers is greater than 30 μm, the strength of the carbon fiber nonwoven fabric may decrease.

Additionally, an average fiber length of 1 to 30 μm results in suitable capacity as an anode active material.

The true density of the carbon fibers is not particularly limited but is preferably from 1.4 to 1.8 g/cm$^3$ and more preferably from 1.4 to 1.7 g/cm$^3$.

The true density of carbon fibers can be measured by the density gradient tube technique.

As the carbon fibers used in the carbon fiber nonwoven fabric, polyacrylonitrile-based carbon fibers, pitch-based carbon fibers, or rayon-based carbon fibers may be used without particular limitation, but pitch-based carbon fibers are preferred. Furthermore, as pitch-based carbon fibers, those having an isotropic structure or those having an anisotropic structure may be used, but pitch-based carbon fibers having an isotropic structure are preferred.

For example, a carbon fiber nonwoven fabric that can be used in the present invention may be obtained by adding a binder to carbon fibers, followed by heat treatment.

Examples of the binder include polyvinyl alcohol, polyacrylonitrile, cellulose, and polyvinyl acetate, but polyvinyl alcohol (PVA) is preferred due to its excellent binding force and because shedding of carbon fibers is small.

The binder is preferably used in a quantity of 5 to 50 parts by mass relative to 100 parts by mass of carbon fibers.

For example, in the case of carbon fiber paper, carbon fiber paper made by adding a binder to short carbon fibers having an average fiber length of 1 to 30 mm, or carbon fiber paper in which the above carbon fiber is further impregnated with resin and heat treated, thereby carbonizing the binder, may be used.

The papermaking method of carbon fiber paper may be a wet method in which short carbon fibers are dispersed in a liquid medium, or a dry method in which short carbon fibers are dispersed in air and allowed to fall and pile up. However, the wet method is preferred because the binder is uniformly mixed.

Examples of the resin used in carbon fiber paper include phenol resin, furan resin, epoxy resin, melamine resin, imide resin, urethane resin, aramid resin, and pitch, which may each be used alone or as a mixture.

As the amount of resin relative to carbon fiber paper, preferably, from 1 to 120 parts by mass of resin relative to 100 parts by mass of short carbon fibers is impregnated and heat treated.

Non-Graphitizable Carbonaceous Material

Non-graphitizable carbon is the general name for ungraphitized carbon that does not change into a graphite structure even when heat treated at a temperature higher than approximately 3000° C., but here, carbonaceous material having a true density of less than 1.70 g/cm$^3$ is called non-graphitizable carbon.

The non-graphitizable carbonaceous material contained in the carbonaceous molded article of the present invention is not particularly limited, but is a non-graphitizable carbonaceous material derived from a carbon precursor selected from the group consisting of pitch, thermoplastic resins, and thermosetting resins.

Specifically, the carbon source of the non-graphitizable carbonaceous material contained in the carbonaceous molded article is not limited as long as it is capable of manufacturing non-graphitizable carbon. Examples thereof include petroleum pitch, coal pitch, thermoplastic resins (for example, ketone resin, polyvinyl alcohol, polyethylene terephthalate, polyacetal, polyacrylonitrile, styrene/divinylbenzene copolymer, polyimide, polycarbonate, modified polyphenylene ether, polybutylene terephthalate, polyarylate, polysulfone, polyphenylene sulfide, polyether ether ketone, polyimide resin, fluorine resin, aramid resin, or polyamide imide), thermosetting resins (for example, epoxy resin, urethane resin, urea resin, diallylphthalate resin, polyester resin, polycarbonate resin, silicon resin, polyacetal resin, nylon resin, aldehyde resin (for example, phenol resin, melamine resin, amino resin, amide resin, or furan resin). Furthermore, petroleum pitch, coal pitch, or thermoplastic resin may be used as carbon sources of non-graphitizable carbon by infusibilization by oxidation treatment or the like.

The non-graphitizable carbonaceous material contained in the carbonaceous molded article of the present invention is not particularly limited but, for example, when heat treated under the same conditions as the heat treatment conditions of a molded article comprising a crude starting material of non-graphitizable carbon, it may be a non-graphitizable carbon having the physical properties below.

Furthermore, the non-graphitizable carbon precursor used in the manufacture of the carbonaceous molded article of the present invention may also be a non-graphitizable carbon precursor having the following physical properties when it is heat treated under the same conditions as the heat treatment conditions of a molded article.

The non-graphitizable carbon can be separated from the carbonaceous molded article by pulverizing the carbonaceous molded article to not greater than 0.1 mm and then selecting an appropriate immersion liquid described in the density gradient tube technique of the carbon fiber density test method (JIS R7603-1999).

That is, in the present specification, separation and identification of non-graphitizable carbon from the non-graphitizable carbon, graphitizable carbon, graphite, and the like contained in the carbonaceous molded article may be performed according to the true density measured using the JIS density gradient tube technique.

Specific Surface Area

The specific surface area of the non-graphitizable carbonaceous material is not particularly limited.

However, the upper limit of BET specific surface area is preferably not greater than 25 m$^2$/g, more preferably not greater than 20 m$^2$/g, even more preferably not greater than 10 m$^2$/g, and yet more preferably not greater than 5 m$^2$/g. The lower limit of BET specific surface area is not particularly limited but is preferably not less than 0.005 m$^2$/g and more preferably not less than 0.01 m$^2$/g. When the BET specific surface area is not less than 0.005 m$^2$/g, when the carbonaceous molded article of the present invention is used as an anode, there is a possibility that the input/output characteristics may improve due to an increase in the reaction area with the electrolyte.

$L_{C(002)}$

The Lc of the non-graphitizable carbonaceous material is not particularly limited but is preferably not greater than 10 nm and more preferably from 0.5 to 2 nm.

When $L_C$ is greater than 10 nm, volume expansion and contraction associated with lithium doping and dedoping increase because multiple hexagonal carbon layers are stacked.

When volume expansion and contraction are large, the carbon structure is destroyed, doping and dedoping of lithium are blocked, and repeating properties become poor, which is not preferable.

Average Interlayer Spacing

The average interlayer spacing of the non-graphitizable carbonaceous material is not particularly limited, but is preferably from 0.365 to 0.400 nm, more preferably from 0.378 to 0.398 nm, and even more preferably from 0.380 to 0.395 nm.

In the case of a carbonaceous material having a small average interlayer spacing of less than 0.375 nm, the expansion and contraction associated with lithium doping and dedoping are large, and voids are formed between particles, which causes the conduction network to be blocked, and thus the material may have poor repeating characteristics.

True Density

The true density of the non-graphitizable carbonaceous material can be measured by either the pycnometer method using butanol or the density gradient tube technique, but the true density of the non-graphitizable carbonaceous material of the carbonaceous molded article of the present invention is that measured by the pycnometer method using butanol. The range of the true density is not particularly limited but is preferably from 1.45 to 1.70 g/cm$^3$, more preferably from 1.50 to 1.70 g/cm$^3$, and even more preferably from 1.50 to 1.65 g/m$^3$.

When the true density is less than 1.45 g/cm$^3$, the doping capacity and dedoping capacity per unit volume are small, which is not preferable.

Furthermore, when the true density is not less than 1.70 g/cm$^3$, it is not preferred because it means that the orderliness of the carbon crystal structure has increased, and since the average interlayer spacing is small, expansion and contraction associated with lithium doping and dedoping increase, which leads to a drop in lithium doping capacity.

Average Particle Size

When the non-graphitizable carbonaceous material contained in the carbonaceous molded article of the present invention is composed of particles, the average particle size is not particularly limited but is preferably from 0.1 to 30.0 µm, more preferably from 3.0 to 30.0 µm, and even more preferably from 4.0 to 19.0 µm.

Graphitizable Carbon

Graphitizable carbon is the general name for ungraphitized carbon that changes into a graphite structure when it is heat treated at a temperature not less than 2000° C., but here, ungraphitized carbon having a true density of not less than 1.70 g/cm$^3$ and not greater than 2.2 g/cm$^3$ is called graphitizable carbon.

The graphitizable carbonaceous material contained in the carbonaceous molded article of the present invention is not particularly limited, but is a graphitizable carbonaceous material derived from a carbon precursor of pitch or thermoplastic resin.

Specifically, the carbon source of the graphitizable carbonaceous material contained in the carbonaceous molded article is not limited as long as it is capable of producing graphitizable carbon. Examples thereof include petroleum pitch, coal pitch, petroleum coke, coal coke, intermediate phase pitch, mesocarbon microbeads, vinyl chloride-based resin, thermoplastic resins (for example, ketone resin, polyvinyl alcohol, polyethylene terephthalate, polyacetal, polyacrylonitrile, styrene/divinylbenzene copolymer, polyimide, polycarbonate, modified polyphenylene ether, polybutylene terephthalate, polyarylate, polysulfone, polyphenylene sulfide, polyether ether ketone, polyimide resin, fluorine resin, aramid resin, or polyamide imide).

These carbon sources are those that have not been infusibilized by oxidation treatment.

The graphitizable carbonaceous material contained in the carbonaceous molded article of the present invention is not particularly limited but, for example, when a crude starting material of graphitizable carbonaceous material is heat treated under the same conditions as the heat treatment conditions of a molded article, the graphitizable carbonaceous material may be a graphitizable carbonaceous material having the physical properties below.

Furthermore, the graphitizable carbon precursor used in the manufacture of the carbonaceous molded article of the present invention may also be a graphitizable carbon precursor having the following physical properties when the graphitizable carbon precursor is heat treated under the same conditions as the heat treatment conditions of a molded article.

Specifically, the physical properties of the graphitizable carbonaceous material are not particularly limited, but that having a BET specific surface area of 0.005 to 25 m$^2$/g, an Lc of not greater than 30 nm, an average interlayer spacing of 0.340 to 0.375 nm, and a true density of 1.51 to 2.20 g/cm$^3$ is preferred.

When the graphitizable carbon is in particulate form, the average particle size is preferably from 0.1 to 30.0 µm.

Furthermore, the graphitizable carbon precursor used in the manufacture of the carbonaceous molded article of the present invention may also be a graphitizable carbon precursor having the above physical properties when the the graphitizable carbon precursor is heat treated under the same conditions as the heat treatment conditions of the molded article.

On the other hand, in separating the non-graphitizable carbon from the carbonaceous molded article, it may be separated by the same method as separating non-graphitizable carbon from the carbonaceous molded article.

That is, in the present specification, separation and specification of graphitizable carbon from the non-graphitizable carbon, graphitizable carbon, graphite, and the like contained in the carbonaceous molded article may be performed according to the true density measured using the JIS density gradient tube technique.

Graphite

The graphite that can be contained in the carbonaceous molded article of the present invention is not particularly limited, and may be natural graphite or artificial graphite.

The physical properties of the graphite are not particularly limited, but graphite particles having a BET specific surface area of 0.1 to 10 m$^2$/g, an L of not less than 15 nm, an average interlayer spacing of 0.340 to 0.335 nm, a true density of not less than 2.20 g/cm$^3$, and an average particle size of 0.1 to 30.0 µm may be used. Furthermore, separation and specification of graphite contained in the carbonaceous molded article may be performed according to the true density measured using the JIS density gradient tube technique, similarly to non-graphitizable carbon or graphitizable carbon.

Metal or Metal Compound Capable of Lithium Doping and Dedoping

Examples of the anode active material contained in the carbonaceous molded article of the present invention include metals or metal compounds capable of lithium doping and dedoping.

Examples of metals capable of lithium doping and dedoping include metals that form alloys with lithium by lithium being doped.

As metals that form alloys with lithium, Mg, Ca, Al, Si, Ge, Sn, Pb, As, Sb, Bi, Ag, Au, Cd, and Hg are known, among which Pb, Sn, Ge, Al, and Si are preferred because they have high capacity.

Furthermore, examples of alloys capable of lithium doping and dedoping include lithium doping type, substitution type, and successive alloying type.

A lithium doping type of alloy is a material that is topotactically doped with lithium at empty sites in the host without a change in the crystal structure of the original alloy (intermetallic compound) during lithium alloy formation.

$$x\text{Li}^+ + \text{MM}' + xe^- \longleftrightarrow \text{Li}_x\text{MM}_{y'}'$$ [Mathematical Formula 1]

Examples of alloys include Cu$_6$Sn$_5$, and Mg$_2$Si.

A substitution type of alloy is a material that is doped with lithium by means of one of the components of the alloy (intermetallic compound) alloying with lithium, and another component precipitating out by phase separation.

Examples thereof include $Sn_2Fe$, $Ni_xSn$, $Co_xSn$, NiSi, FeSi, and $Mg_xNi$.

A successive alloying type of alloy (intermetallic compound) is a material that is doped with lithium by means of one component alloying first and then phase-separating and acting as a matrix, and then another component alloying. Examples thereof include SnSb, InSb, and Ag—Sn—Sb.

Examples of metal compounds capable of lithium doping and dedoping include metal oxides, metal nitrides, and metal sulfides.

Examples of metal oxides include $Nb_2O_5$, $TiO_2$, $Li_{4/3}Ti_{5/3}O_4$, $WO_2$, $MoO_2$, $Fe_2O_3$, $SnO_2$, SiO, and CoO.

Examples of metal nitrides include $Li_3N$, $LiFe_3N_2$, and $Li_{2.6}Co_{0.4}N$.

Additionally, examples of metal sulfides include Sn—Sb—S glass.

Examples of metals or metal compounds capable of lithium doping and dedoping include metal oxides in which lithium enters the anode by reacting with oxygen and converting to $Li_2O$ or the like.

Note that in the present specification, "lithium doping and dedoping" includes lithium conversion.

For the anode active material, a higher capability for lithium doping and dedoping and a higher proportion of dedoping capacity relative to doping capacity during the initial doping and dedoping reaction (initial coulombic efficiency) are preferred.

Furthermore, a higher true density of the active material (when a plurality of active material particles are used, the average true density of the plurality of active material particles) is preferred in order to improve volume energy density.

A metal or metal compound capable of lithium doping and dedoping has a higher capacity than carbonaceous material or graphitic material.

Furthermore, since expansion and contraction of the electrode as a whole can be suppressed by adding substances not involved in alloying with lithium, substances that do not contribute to alloying with lithium may be added to elements that form alloys with lithium.

The content of carbon fiber nonwoven fabric in the carbonaceous molded article for electrodes of the present invention is not particularly limited but is preferably from 7 to 50 wt %, more preferably from 8 to 40 wt %, and even more preferably from 9 to 30 wt %.

Furthermore, in certain aspects, the content is preferably from 10 to 50 wt %, more preferably from 12 to 40 wt %, and even more preferably from 14 to 30 wt %. Due to the content being from 7 to 50 wt %, the carbon fiber nonwoven fabric can exhibit sufficient capacity as an anode material.

In addition, the content of anode active material in the carbonaceous molded article for electrodes is not particularly limited but is preferably from 50 to 93 wt %, more preferably from 60 to 92 wt %, and even more preferably from 70 to 91 wt %. Furthermore, in certain aspects, the content is preferably from 50 to 90 wt %, more preferably from 60 to 88 wt %, and even more preferably from 70 to 86 wt %. Furthermore, the content of anode active material in the carbonaceous molded article for electrodes is not limited, but when non-graphitizable carbon is contained as a mandatory component, the non-graphitizable carbon is preferably from 1 to 93 wt %, graphitizable carbon is from 0 to 92 wt %, graphite is from 0 to 92 wt %, and metal or metal compounds capable of lithium doping and dedoping is 0 to 92 wt %.

The content of graphite is preferably not greater than 60 wt %.

This is because when the content of graphite is too high, expansion and contraction may be large.

Furthermore, when graphitizable carbon wt % is contained as a mandatory component, the graphitizable carbon is preferably from 1 to 93 wt %, non-graphitizable carbon is from 0 to 92 wt %, graphite is from 0 to 92 wt %, and metal or metal compounds capable of lithium doping and dedoping is 0 to 92 wt %.

The content of graphite is particularly preferably not greater than 60 wt %.

This is because when the content of graphite is too high, expansion and contraction may be large.

Furthermore, in certain aspects, when non-graphitizable carbon is contained as a mandatory component, the non-graphitizable carbon is preferably from 1 to 90 wt %, graphitizable carbon is from 0 to 89 wt %, graphite is from 0 to 89 wt %, and metal or metal compounds capable of lithium doping and dedoping is from 0 to 89 wt %. Furthermore, when graphitizable carbon is contained as a mandatory component, the graphitizable carbon is preferably from 1 to 90 wt %, non-graphitizable carbon is from 0 to 89 wt %, graphite is from 0 to 89 wt %, and metal or metal compounds capable of lithium doping and dedoping is from 0 to 89 wt %.

The content of graphite is particularly preferably not greater than 60 wt %.

When the content of graphite is too high, expansion and contraction may be large, the carbonaceous molded article may be destroyed, doping and dedoping of lithium may be blocked, and repeating properties may become poor.

The carbonaceous molded article of the present invention is not limited as long as it can be used as an electrode.

An example of an item that is used for the carbonaceous molded article of the present invention is a non-aqueous electrolyte secondary battery.

Examples of non-aqueous electrolyte secondary batteries include lithium-ion secondary batteries, and sodium ion secondary batteries.

The carbonaceous molded article of the present invention may also be used as an electrode of an all-solid-state battery, examples of which include all-solid-state lithium-ion secondary batteries, and all-solid-state sodium-ion secondary batteries. Furthermore, it may be used as a bipolar electrode of a bipolar battery.

Additionally, the carbonaceous molded article of the present invention may be used as an electrode of a redox flow battery.

[2] Electrode for Batteries

The electrode for batteries of the present invention comprises the aforementioned carbonaceous molded article for electrodes.

The carbonaceous molded article for electrodes of the present invention is not limited, but may be used as an electrode having no current collector.

However, when the carbonaceous molded article for electrodes of the present invention is bonded to the current collector, the molded article of the present invention may be used as an electrode, and may also be used as a current collector, usually without being limited to those used in electrodes for secondary batteries.

Examples of current collectors include copper and nickel.

Furthermore, the carbonaceous material of the present invention enables production of an anode having high conductivity without a conductive agent.

However, the electrode for batteries of the present invention may also contain a conductive agent (for example, conductive carbon black, vapor grown carbon fibers (VGCF), or carbon nanotubes).

A conductive agent is added to improve conductivity of the electrode.

That is, a conductive agent is a conductive electron conductor, and is not something used as an ion conductor.

The aforementioned vapor grown carbon fibers are electron conducting carbon fibers. Vapor grown carbon fibers are not substantially doped and dedoped with lithium.

[3] Non-Aqueous Electrolyte Secondary Battery

The non-aqueous electrolyte secondary battery of the present invention comprises the aforementioned carbonaceous molded article for electrodes or electrode for batteries. The non-aqueous electrolyte secondary battery that comprises the carbonaceous molded article for electrodes of the present invention is particularly excellent in charge/discharge capacity, irreversible capacity, and efficiency.

Manufacturing of Non-Aqueous Electrolyte Secondary Battery

When an anode for a non-aqueous electrolyte secondary battery is formed from the carbonaceous molded article for electrodes of the present invention, the other materials constituting the battery such as the cathode material, separator, and electrolyte solution are not particularly limited, and various materials that have been conventionally used or proposed for non-aqueous solvent secondary batteries can be used.

For example, layered oxide-based (as represented by $LiMO_2$, where M is a metal such as $LiCoO_2$, $LiNiO_2$, $LiMnO_2$, or $LiNi_xCo_yMn_zO_2$ (where x, y, and z represent composition ratios), olivine-based (as represented by $LiMPO_4$, where M is a metal such as $LiFePO_4$), and spinel-based (as represented by $LiM_2O_4$, where M is a metal such as $LiMn_2O_4$) complex metal chalcogen compounds are preferable as cathode materials, and these chalcogen compounds may be mixed as necessary.

A cathode is formed by coating a conductive current collector with a coating layer formed from these cathode materials, together with an appropriate binder and a carbon material for imparting conductivity to the electrode.

A non-aqueous electrolyte solution used with this cathode and anode combination is typically formed by dissolving an electrolyte in a non-aqueous solvent. As the non-aqueous solvent, for example, one type or a combination of two or more types of organic solvents, such as propylene carbonate, ethylene carbonate, dimethyl carbonate, diethyl carbonate, dimethoxy ethane, diethoxy ethane, γ-butyl lactone, tetrahydrofuran, 2-methyltetrahydrofuran, sulfolane, and 1,3-dioxolane can be used. Furthermore, $LiClO_4$, $LiPF_6$, $LiBF_4$, $LiCF_3SO_3$, $LiAsF_6$, LiCl, LiBr, $LiB(C_6H_5)_4$, $LiN(SO_3CF_3)_2$ and the like can be used as an electrolyte.

Electrolyte Additive

The non-aqueous electrolyte secondary battery of the present invention preferably contains an additive having a LUMO value within a range of −1.10 to 1.11 eV in the electrolyte, wherein the LUMO value is calculated by an AM1 (Austin Model 1) calculation method of a semiemperical molecular orbital model.

The non-aqueous electrolyte secondary battery comprising an anode of a non-aqueous electrolyte secondary battery comprising a carbonaceous material and an additive according to the present invention has high doping and dedoping capacity and demonstrates excellent high-temperature cycle characteristics.

A secondary battery is typically formed by immersing, in an electrolyte solution, a cathode layer and an anode electrode layer, which are produced as described above, so that the two layers are arranged facing each other via, as necessary, a liquid permeable separator formed from nonwoven fabric and other porous materials.

As a separator, a liquid permeable separator formed from a nonwoven fabric and other porous materials that are typically used in secondary batteries can be used. Alternatively, in place of a separator or together with a separator, a solid electrolyte formed from polymer gel in which an electrolyte solution is impregnated can be also used.

[4] Method for Manufacturing Carbonaceous Molded Article for Electrodes

A first embodiment of the method for manufacturing a carbonaceous molded article for electrodes of the present invention comprises: (1) an impregnation step of impregnating a carbon fiber nonwoven fabric with a slurry containing a carbonaceous material precursor dispersed in a solvent, and obtaining an anode active material precursor impregnated carbon fiber nonwoven fabric, (2) a molding step of molding the anode active material precursor impregnated carbon fiber nonwoven fabric, and obtaining a molded article, and (3) a heat treatment step of heat treating the molded article at 1000° C. to 2000° C. in a non-oxidizing gas atmosphere.

The carbonaceous material precursor is preferably a non-graphitizable carbonaceous material and/or graphitizable carbonaceous material.

The heat treated carbonaceous molded article for electrodes contains preferably not less than 7 wt % and more preferably not less than 10 wt % of carbon fiber nonwoven fabric.

Due to the volatile content contained in the carbonaceous material precursor, a carbonaceous molded article for electrodes in which the carbonaceous material and the carbon fiber nonwoven fabric are tightly bonded can be obtained. Furthermore, in the manufacturing method of the present invention, the manufacturing process can be simplified because the method does not include an anode active material coating step performed in conventional anode manufacturing.

In the method of manufacturing a carbonaceous molded article for electrodes of the present invention, the above slurry may also contain one or more anode active materials selected from the group consisting of metals capable of lithium doping and dedoping and metal compounds capable of lithium doping and dedoping.

That is, the method of manufacturing a carbonaceous molded article for electrodes of the present invention may comprise: (1) an impregnation step of impregnating a carbon fiber nonwoven fabric with a slurry containing one or more anode active materials selected from the group consisting of metals capable of lithium doping and dedoping and metal compounds capable of lithium doping and dedoping, and a carbonaceous material precursor, which are dispersed in a solvent, and obtaining an anode active material precursor impregnated carbon fiber nonwoven fabric, (2) a molding step of molding the anode active material precursor impregnated carbon fiber nonwoven fabric, and obtaining a molded article, and (3) a heat treatment step of heat treating the molded article at 1000° C. to 2000° C. in a non-oxidizing gas atmosphere.

In the method of manufacturing the carbonaceous molded article for electrodes of the present invention, in the above impregnation step (1), one or more anode active materials or the like selected from the group consisting of non-graphitizable carbon, graphitizable carbon, and graphite may be further dispersed in the solvent, and the carbon fiber nonwoven fabric may be impregnated with the solvent.

That is, in the method of manufacturing the carbonaceous molded article for electrodes of the present invention, in the above impregnation step (1), non-graphitizable carbon, graphitizable carbon, graphite, or a combination of two or more thereof may be further dispersed in the solvent, and the carbon fiber nonwoven fabric may be impregnated with the solvent.

Additionally, in the method of manufacturing the carbonaceous molded article for electrodes of the present invention, the molded article in the molding step (2) may be obtained by compression molding.

Non-Graphitizable Carbonaceous Material and Non-Graphitizable Carbonaceous Material Precursor The non-graphitizable carbonaceous materials that can be used in the manufacturing method of the present invention is not particularly limited, but those having the same physical properties as the non-graphitizable carbonaceous material described in the above section "Carbonaceous molded article for electrodes" may be used, and those that have the same physical properties as the above non-graphitizable carbonaceous materials by undergoing heat treatment may be used.

A non-graphitizable carbonaceous material precursor may be used alone or a mixture of a non-graphitizable carbonaceous material and a non-graphitizable carbonaceous material precursor may be used to obtain the non-graphitizable carbonaceous material contained in the carbonaceous molded article for electrodes in the manufacturing method of the present invention.

This is because non-graphitizable carbonaceous material precursors have a large volatile content and can bind the non-graphitizable carbonaceous material and the carbonaceous material precursor to the carbon fiber nonwoven fabric during molding prior to heat treatment.

Additionally, the non-graphitizable carbonaceous material precursor preferably will exhibit the same physical properties as the non-graphitizable carbonaceous material described in the above section "Carbonaceous molded article for electrodes" by undergoing the heat treatment step of this manufacturing method (heat treatment at 1000° C. to 2000° C.).

Furthermore, the non-graphitizable carbonaceous material or non-graphitizable carbonaceous material precursor is preferably in particulate form.

However, a liquid non-graphitizable carbonaceous material precursor may also be used.

Graphitizable Carbonaceous Material and Graphitizable Carbonaceous Material Precursor The graphitizable carbonaceous materials that can be used in the manufacturing method of the present invention is not particularly limited, but those having the same physical properties as the graphitizable carbonaceous material described in the above section "Carbonaceous molded article for electrodes" may be used, and those that have the same physical properties as the above graphitizable carbonaceous materials by undergoing heat treatment may be used.

A graphitizable carbonaceous material precursor may be used alone or a mixture of a graphitizable carbonaceous material and a graphitizable carbonaceous material precursor may be used to obtain the graphitizable carbonaceous material contained in the carbonaceous molded article for electrodes in the manufacturing method of the present invention.

This is because graphitizable carbonaceous material precursors have a large volatile content and can bind the carbonaceous material and the carbonaceous material precursor to the carbon fiber nonwoven fabric during molding prior to heat treatment. The graphitizable carbonaceous material precursor preferably will exhibit the same physical properties as the graphitizable carbonaceous material described in the above section "Carbonaceous molded article for electrodes" by undergoing the heat treatment step of this manufacturing method (heat treatment at 1000° C. to 2000° C.).

Furthermore, the graphitizable carbonaceous material or graphitizable carbonaceous material precursor is preferably in particulate form.

However, a liquid graphitizable carbonaceous material precursor may also be used.

Graphite

The graphite that can be used in the manufacturing method of the present invention is not particularly limited, but the graphite described in the above section "Carbonaceous molded article for electrodes" may be used.

Note that in this specification, "anode active material" means a non-graphitizable carbonaceous material, graphitizable carbonaceous material, graphite, or a metal or metal compound capable of lithium doping and dedoping, while "anode active material precursor" and "turbostratic structure carbonaceous material precursor" mean a non-graphitizable carbonaceous material precursor or graphitizable carbonaceous material precursor.

Metal or Metal Compound Capable of Lithium Doping and Dedoping

The metal or metal compound capable of lithium doping and dedoping that can be used in the manufacturing method of the present invention is not particularly limited, but the metal or metal compound capable of lithium doping and dedoping described in the above section "Carbonaceous molded article for electrodes" may be used.

In the manufacturing method of the present invention, when a turbostratic structure carbonaceous material precursor and a metal or metal compound capable of lithium doping and dedoping are mandatory components, a mixture of turbostratic structure carbonaceous material and/or graphite may be used.

This is because turbostratic structure carbonaceous material precursors have a large volatile content and can bind the anode active material to the carbon fiber nonwoven fabric during molding prior to heat treatment.

Additionally, the turbostratic structure carbonaceous material precursor will exhibit the same physical properties as the turbostratic structure carbonaceous material described in the above section "Carbonaceous molded article for electrodes" by undergoing the heat treatment step of this manufacturing method.

Carbon Fiber Nonwoven Fabric

The carbon fiber nonwoven fabric that can be used in the present invention is a nonwoven fabric comprising carbon fibers, and is not limited as long as it can be impregnated with an anode active material precursor. Carbon fiber paper or carbon fiber felt may be used.

In the manufacturing method of the present invention, the shape of the nonwoven fabric needs to be maintained in the anode active material precursor impregnation step, and therefore, bonding of the carbon fibers needs to be maintained in the impregnation solution.

For example, a carbon fiber nonwoven fabric may be prepared by dispersing carbon fiber chops, obtained by cutting carbon fibers into short pieces, in a solution containing a binder component, and making the carbon fibers into paper.

The structure of the carbon fibers that constitute the carbon fiber nonwoven fabric is not particularly limited, but is preferably a carbon structure with little expansion and contraction due to lithium doping and dedoping.

The carbon fiber having such a structure is not particularly limited but preferably has a true density of 1.4 to 1.8 g/cm$^3$, and more preferably from 1.4 to 1.7 g/cm$^3$.

The average fiber length of the carbon fiber is not particularly limited but is preferably from 1 to 30 mm.

Furthermore, the average fiber diameter of the carbon fiber is preferably from 1 to 30 μm.

Additionally, the thickness of the carbon fiber nonwoven fabric affects the thickness of the active material molded article of the present invention.

Therefore, the thickness of the carbon fiber nonwoven fabric is not greater than 1 mm, preferably not greater than 0.7 mm, and particularly preferably not greater than 0.5 mm.

An example of the carbon fiber nonwoven fabric that may be used is carbon fiber paper (carbon paper, E-104, manufactured by Kureha Corporation).

Furthermore, when the carbon fiber nonwoven fabric is impregnated with the above anode active material and/or anode active material precursor, there is a possibility that the binder of the carbon fibers of the carbon fiber nonwoven fabric that constitute the carbon fiber nonwoven fabric will be dissolved by the impregnation solution and the carbon fiber nonwoven fabric will disintegrate.

For this reason it is preferred that heat treatment or the like be performed so that the carbon fiber nonwoven fabric does not disintegrate.

(1) Impregnation Step

The impregnation step in the manufacturing method of the present invention is a step of impregnating a carbon fiber nonwoven fabric with an anode active material precursor dispersed in a solvent, and obtaining an anode active material precursor impregnated carbon fiber nonwoven fabric.

Specifically, for example, a non-graphitizable carbonaceous material precursor and/or a graphitizable carbonaceous material precursor are dispersed in a solvent, and a carbon fiber nonwoven fabric is impregnated with the non-graphitizable carbonaceous material precursor and/or graphitizable carbonaceous material precursor.

The solvent preferably contains a thickener.

Then, the anode active material precursor impregnated carbon fiber nonwoven fabric which has been impregnated with a precursor (particles) is dried to obtain a dried anode active material precursor impregnated carbon fiber nonwoven fabric. Furthermore, the above dispersion solvent may further contain one or more anode active materials selected from the group consisting of non-graphitizable carbon, graphitizable carbon, graphitizable carbon precursor, and graphite, and the carbon fiber nonwoven fabric may be impregnated with the anode active materials.

Hereinafter, anode active material and/or anode active material precursor are called "anode active material precursor or the like."

Additionally, the impregnation step in the manufacturing method of the present invention may be a step of impregnating a carbon fiber nonwoven fabric with an anode active material precursor and a metal or metal compound capable of lithium doping and dedoping, which are dispersed in a solvent, and obtaining an anode active material precursor impregnated carbon fiber nonwoven fabric.

Specifically, a turbostratic structure carbonaceous material precursor and a metal or metal compound capable of lithium doping and dedoping are dispersed in a solvent, and a carbon fiber nonwoven fabric is impregnated with the turbostratic structure carbonaceous material precursor and a metal or metal compound capable of lithium doping and dedoping.

The solvent preferably contains a thickener.

Then, the carbon fiber nonwoven fabric which has been impregnated with a turbostratic structure carbonaceous material precursor and a metal or metal compound capable of lithium doping and dedoping is dried to obtain a dried anode active material precursor impregnated carbon fiber nonwoven fabric.

Furthermore, the above dispersion solvent may further contain an anode active material containing a turbostratic structure carbonaceous material and/or graphite, and the carbon fiber nonwoven fabric may be impregnated with these anode materials. The carbon fiber nonwoven fabric used in the manufacturing method of the present invention is not particularly limited as long as it is a nonwoven fabric containing carbon fibers, and the carbon fiber nonwoven fabric described in the above section "Carbonaceous molded article for electrodes" may be used.

Specifically, a nonwoven fabric composed of pitch-based carbon fibers (pitch-based isotropic carbon fibers or pitch-based anisotropic carbon fibers), acrylic-based carbon fibers, polyacrylonitrile-based carbon fibers, rayon-based carbon fibers, or combinations thereof may be used, but using a carbon fiber nonwoven fabric having non-graphitizable carbon is preferred from the perspective that there is little structural change in the fibers during charging and discharging.

The true density of such carbon fibers is not greater than 1.8 g/cm$^3$, and particularly preferably not greater than 1.7 g/cm$^3$.

Furthermore, carbon fiber nonwoven fabric is formed by bonding the fibers to each other using an appropriate paste, but the shape of the carbon fiber nonwoven fabric needs to be maintained in the impregnation step.

A preferred method for increasing the water resistance of the carbon fiber nonwoven fabric is heat treatment in a non-oxidizing gas atmosphere at not lower than 100° C., more preferably not lower than 150° C., and particularly preferably not lower than 200° C.

For example, the above anode active material precursor or the like is dispersed in a solvent containing a thickener to prepare a slurry for anode active material impregnation.

The carbon fiber nonwoven fabric is impregnated with this slurry for anode active material impregnation.

After the carbon fiber nonwoven fabric is impregnated with the anode active material precursor or the like, it is dried to prepare an anode active material precursor impregnated nonwoven fabric.

As the drying method, drying can be performed efficiently by placing far infrared devices or the like on both sides of the carbon fiber nonwoven fabric that has been impregnated with anode active material precursor or the like, and passing the carbon fiber nonwoven fabric between the devices.

The solvent is not particularly limited as long as the anode active material precursor or the like are dispersed in the solvent, but examples thereof include aqueous solvents and organic solvents.

The aqueous solvents are not limited as long as they contain water, but examples thereof include water (e.g., deionized water), alcohol aqueous solutions composed of deionized water and alcohol (e.g., methanol, ethanol, propanol, or butanol), acetone aqueous solutions containing deionized water and acetone, and NMP aqueous solutions containing deionized water and N-methylpyrrolidone.

Examples of organic solvents include alcohols (e.g., methanol, ethanol, propanol, or butanol), acetone, N-methylpyrrolidone (NMP), carbon tetrachloride, chloroform, benzene, hexane, and toluene.

The amount of anode active material precursor or the like dispersed in the solvent may be determined as appropriate according to the desired physical properties of the carbonaceous molded article for electrodes.

The carbonaceous material precursor is carbonized and reduced in weight by the heat treatment step (3).

On the other hand, the carbon fibers contained in the carbon fiber nonwoven fabric are heat treated and carbonized, and thus there is little weight loss due to heat treatment. Furthermore, there is little weight loss of graphite due to heat treatment.

Therefore, in order to set the content of carbon fiber nonwoven fabric contained in the obtained carbonaceous molded article for electrode, to not less than 7 wt % (more preferably not less than 10 wt %) and to set the content of graphite to not greater than 92 wt % (more preferably not greater than 60 wt %), the amounts of carbon fiber nonwoven fabric and graphite in the impregnation step (1) are less than the amounts contained in the ultimately obtained carbonaceous molded article, and it is preferable to adjust the amount of carbon fiber nonwoven fabric in the obtained anode active material precursor impregnated nonwoven fabric.

However, since the carbon fiber nonwoven fabric also contains a volatile binder component, it is preferable to adjust the amount of carbon fiber nonwoven fabric in consideration of this point.

The content of carbon fiber nonwoven fabric in the anode active material precursor impregnated nonwoven fabric is not particularly limited, but is preferably from 10 to 50 wt %, more preferably from 12 to 40 wt %, and even more preferably from 14 to 30 wt %.

In addition, the content of anode active material precursor or the like in the anode active material precursor impregnated nonwoven fabric is not particularly limited, but is preferably from 50 to 90 wt %, more preferably from 60 to 88 wt %, and even more preferably from 70 to 86 wt %.

Furthermore, the content of anode active material is not limited, but when non-graphitizable carbon is contained as a mandatory component, the content of non-graphitizable carbon is preferably from 1 to 90 wt %, the content of graphitizable carbon is from 0 to 89 wt %, the content of graphite is from 0 to 89 wt %, and the content of metal or metal compounds capable of lithium doping and dedoping is from 0 to 89 wt %.

In particular, the content of graphite is preferably not greater than 60 wt %, and more preferably not greater than 55 wt %. When the content of graphite is too high, expansion and contraction will be large, the carbonaceous molded article may be destroyed, doping and dedoping of lithium may be blocked, and repeating properties may become poor.

Furthermore, when graphitizable carbon is contained as a mandatory component, the content of graphitizable carbon is from 1 to 90 wt %, the content of non-graphitizable carbon is from 0 to 89 wt %, the content of graphite is from 0 to 89 wt %, and the content of a metal or metal compound capable of lithium doping and dedoping is from 0 to 89 wt %.

In particular, the content of graphite is preferably not greater than 60 wt %, and more preferably not greater than 55 wt %. When the content of graphite is too high, expansion and contraction will be large, the carbonaceous molded article may be destroyed, doping and dedoping of lithium may be blocked, and repeating properties may become poor.

Furthermore, the content of anode active material is not limited, but the content of turbostratic structure carbon is from 1 to 95 wt %, the content of graphite is from 0 to 95 wt %, the content of a metal or metal compound capable of lithium doping and dedoping is from 1 to 95 wt %, and the content of metal or metal compounds capable of lithium doping and dedoping is from 0 to 89 wt %.

The anode active material precursor used in the impregnation step is preferably in particulate form.

However, liquid anode active material precursors may be used.

A liquid anode active material precursor is dispersed in a solvent and the carbon fiber nonwoven fabric is impregnated with the solvent, but it is also possible to immerse the carbon fiber nonwoven fabric in the liquid anode active material precursor to impregnate the fabric with the anode active material precursor.

Furthermore, a mixture of liquid and particulate form may be used for the anode active material precursor.

(2) Molding Step

The molding step in the manufacturing method of the present invention is a step of molding the anode active material precursor impregnated carbon fiber nonwoven fabric and obtaining a molded article.

The obtained anode active material precursor impregnated carbon fiber nonwoven fabric may be molded by appropriately cutting and drying.

Additionally, molding may be performed by compression molding in which surface pressure is applied to the anode active material precursor impregnated carbon fiber nonwoven fabric.

Specifically, compression molding may be performed as follows.

First, anode active material precursor impregnated carbon fiber nonwoven fabric is cut to an optional size.

The cut anode active material precursor impregnated carbon fiber nonwoven fabric is put into, for example, a pressurized hot press apparatus, and heated in a non-oxidizing gas atmosphere.

The attained temperature is not limited but is preferably from 100 to 700° C.

In the non-oxidizing gas atmosphere, a surface pressure of 20 to 90 $kgf/cm^2$ is applied to the anode active material precursor impregnated carbon fiber nonwoven fabric. After heating was performed for a certain time at 100 to 700° C., the pressure is returned to atmospheric pressure and cooled to room temperature.

The heating time may be determined as appropriate according to the size of the anode active material precursor impregnated carbon fiber nonwoven fabric and the desired porosity.

The non-oxidizing gas is not particularly limited, but examples thereof include helium, nitrogen, and argon, and these may be used alone or as a mixture.

(3) Heat Treatment Step

In the production method of the present invention, the heat treatment step is a step of heat treating the molded article at 1000° C. to 2000° C. in a non-oxidizing gas atmosphere.

Heat treatment is preferably performed in a non-oxidizing gas atmosphere.

In the technical field of the present invention, heat treatment at 1000° C. to 2000° C. is typically called "final heat treatment."

In the heat treatment step of the present invention, pre-heat treatment can be performed prior to final heat treatment as necessary.

In the production method of the present invention, heat treatment can be performed in accordance with ordinary procedures, and a carbonaceous molded article for electrodes may be obtained by heat treatment.

The heat treatment temperature is from 1000 to 2000° C. If the heat treatment temperature is lower than 1000° C., it is not preferable because a large amount of functional groups remain in the carbonaceous molded article, the value of H/C increases, and the irreversible capacity also increases due to a reaction with lithium.

The lower limit of the heat treatment temperature in the present invention is not lower than 1000° C., preferably not lower than 1050° C., more preferably not lower than 1100° C., and particularly preferably not lower than 1150° C.

On the other hand, when the heat treatment temperature is higher than 2000° C., it is not preferable because the selective orientation of the carbon hexagonal plane increases and the discharge capacity decreases.

The upper limit of the heat treatment temperature in the present invention is not higher than 2000° C., more preferably lower than 2000° C., even more preferably not higher than 1800° C., yet more preferably not higher than 1600° C., and most preferably not higher than 1500° C.

Furthermore, when a metal or metal compound capable of lithium doping and dedoping is used, the lower limit of the heat treatment temperature in the present invention is not lower than 1000° C., more preferably not lower than 1050° C., and particularly preferably not lower than 1100° C.

On the other hand, when the heat treatment temperature is higher than 2000° C., it is not preferable because the selective orientation of the carbon hexagonal plane increases and the discharge capacity decreases.

Furthermore, it is not preferable because the added metal or metal compound reacts with the carbonaceous material.

The upper limit of the heat treatment temperature in the present invention is not higher than 2000° C., more preferably lower than 1300° C., and even more preferably not higher than 1250° C.

The heat treatment is preferably performed in a non-oxidizing gas atmosphere. Examples of the non-oxidizing gas include helium, nitrogen, and argon, and these may be used alone or as a mixture.

The heat treatment may also be performed in a gas atmosphere in which a halogen gas such as chlorine is mixed with the non-oxidizing gas described above.

The supplied amount of gas (circulated amount) is not limited, but is not less than 1 mL/min, preferably not less than 5 mL/min, and even more preferably not less than 10 mL/min, per 1 g of the molded article.

Furthermore, the heat treatment can be performed under reduced pressure at a pressure of not greater than 10 kPa, for example.

The heat treatment time is not particularly limited, but the heat treatment can be performed for 0.05 to 10 hours, preferably from 0.05 to 3 hours, and more preferably from 0.05 to 1 hour, in terms of the retention time for which the temperature is maintained at 1000° C. or higher.

A second embodiment of the method of manufacturing a carbonaceous molded article for electrodes of the present invention comprises: (1) an impregnation step of impregnating a carbon fiber precursor nonwoven fabric with a slurry containing a carbonaceous material precursor dispersed in a solvent, and obtaining an anode active material precursor impregnated carbon fiber precursor nonwoven fabric, (2) a molding step of molding the anode active material precursor impregnated carbon fiber precursor nonwoven fabric, and obtaining a molded article, and (3) a heat treatment step of heat treating the molded article at 1000° C. to 2000° C. in a non-oxidizing gas atmosphere.

That is, a carbonaceous molded article for electrodes can be obtained by using a "carbon fiber precursor nonwoven fabric" instead of a "carbon fiber nonwoven fabric" in the above method of manufacturing the carbonaceous molded article for electrodes.

Carbon Fiber Precursor Nonwoven Fabric

The carbon fiber precursor nonwoven fabric that can be used in the present invention is a precursor of a nonwoven fabric comprising a carbon fiber precursor, and is not limited as long as it can be impregnated with an anode active material precursor. A precursor of carbon fiber paper comprising a carbon fiber precursor or a precursor of carbon fiber felt comprising a carbon fiber precursor may be used.

The structure of the carbon fiber precursor that constitutes the carbon fiber precursor nonwoven fabric is not particularly limited, but is preferably a carbon fiber precursor by which a carbon structure with little expansion and contraction due to lithium doping and dedoping is obtained.

The true density of the carbon fiber precursor having such a structure is not particularly limited but is preferably from 1.4 to 1.8 g/cm$^3$ and more preferably from 1.4 to 1.7 g/cm$^3$.

The average fiber length of the carbon fiber precursor is not particularly limited but is preferably from 1 to 30 mm.

Furthermore, the average fiber diameter of the carbon fiber precursor is preferably from 1 to 30 µm.

Additionally, the thickness of the carbon fiber precursor nonwoven fabric affects the thickness of the active material molded article of the present invention.

Therefore, the thickness of the carbon fiber precursor nonwoven fabric is not greater than 1 mm, preferably not greater than 0.7 mm, and particularly preferably not greater than 0.5 mm.

Furthermore, when the carbon fiber precursor nonwoven fabric is impregnated with the above anode active material and/or anode active material precursor, there is a possibility that the binder of the carbon fiber precursors that constitute the carbon fiber precursor nonwoven fabric will be dissolved by the impregnation solution and the carbon fiber precursor nonwoven fabric will disintegrate.

For this reason, it is preferred that heat treatment or the like be performed so that the carbon fiber precursor nonwoven fabric does not disintegrate.

In a second embodiment of the method of manufacturing a carbonaceous molded article for electrodes, a carbonaceous molded article for electrodes can be manufactured by the same steps using the same anode active material or the like as the first embodiment except that a carbon fiber precursor nonwoven fabric is used instead of a carbon fiber nonwoven fabric.

The carbon fiber precursor contained in the carbon fiber precursor nonwoven fabric used in the second embodiment has not been carbonized.

However, by heat treatment in the heat treatment step (3) in the manufacturing method of the present invention, the carbon fiber precursor is carbonized, so that the carbon fiber precursor nonwoven fabric in the second embodiment exhibits the same functions as the carbon fiber nonwoven fabric in the first embodiment.

Therefore, the carbonaceous molded article for electrodes obtained in the second embodiment exhibits the remarkable effects of the present invention in the same manner as the carbonaceous molded article for electrodes obtained in the first embodiment.

EXAMPLES

The present invention will be described in detail hereinafter using examples, but these examples do not limit the scope of the present invention.
The methods of measuring the physical property values ("thickness of carbonaceous molded article," "bulk density," "specific surface area," "hydrogen/carbon atomic ratio (H/C)," "true density by pycnometer method using butanol," "true density by density gradient tube technique," "porosity," "volatile content," "measurement of combustion temperature by differential thermal analysis," "average interlayer spacing $d_{002}$ by X-ray diffraction," "$L_{C(002)}$ by X-ray diffraction," "average particle size by laser diffraction," and "pore volume by mercury intrusion") of the carbonaceous molded article for electrodes of the present invention are described below, but the physical property values described in the present specification including the working examples are based on the values determined by the following methods.

Thickness of Carbonaceous Molded Article
The thickness of the carbonaceous molded article was measured using a thickness gauge model ID-C112X, 7002-10 manufactured by Mitutoyo Corporation.

Bulk Density of Carbonaceous Molded Article
The bulk density of the carbonaceous molded article was calculated by dividing the mass of the carbonaceous molded article by the volume (area×thickness) determined from the exterior dimensions of the carbonaceous molded article.
The mass of the carbonaceous molded article was measured using an analytical electronic balance model XS105DUV manufactured by Mettler-Toledo International Inc.
The area of the carbonaceous molded article was calculated by punching the carbonaceous molded article into a disc shape with a diameter of 15 mm.
Furthermore, when the carbonaceous molded article can not be punched into a disc shape, the exterior dimensions of the carbonaceous molded article were measured using calipers model CD-20 manufactured by Mitutoyo Corporation, and the volume was calculated.
The bulk density $\rho_B$ of the carbonaceous molded article was calculated by dividing the above weight by the volume.

Specific Surface Area
The specific surface area (SSA) was measured in accordance with the method stipulated in JIS Z8830.
A summary is given below.
A value $v_m$ was determined by a one-point method (relative pressure x=0.2) based on nitrogen adsorption at the temperature of liquid nitrogen using the approximation $v_m=1/(v(1-x))$ derived from the BET equation, and the specific surface area of the sample was calculated from the following formula:

(Specific surface area (SSA)= 
4.35×$v_m$ (m²/g) [Mathematical Formula 2]

(Where, $v_m$ is the amount of adsorption (cm³/g) required to form a monomolecular layer on the sample surface; v is the amount of adsorption (cm³/g) actually measured, and x is relative pressure.)
Specifically, the amount of adsorption of nitrogen in the carbonaceous material at the temperature of liquid nitrogen was measured as follows using a "Flow Sorb II 2300" manufactured by Micromeritics.
A test tube was filled with the sample cut to approximately 2 mm×2 mm, and the test tube was cooled to −196° C. while infusing helium gas containing nitrogen gas at a concentration of 20 mol % so that the nitrogen was absorbed into the carbonaceous material.

The test tube was returned to room temperature.
The amount of nitrogen desorbed from the sample at this time was measured with a thermal conductivity detector and used as the adsorption gas amount v.

Hydrogen/Carbon Atomic Ratio (H/C)
The atomic ratio was measured in accordance with the method stipulated in JIS M8819. That is, each of the mass proportions of hydrogen and carbon in a sample obtained by elemental analysis using a CHN analyzer (2400II manufactured by Perkin Elmer Inc.) was divided by the mass of each element, and then the ratio of the numbers of hydrogen/carbon atoms was determined.

True Density Determined by Pycnometer Method Using Butanol
Measurements were performed using butanol in accordance with the method stipulated in JIS R7212.
A summary is given below.
The mass ($m_1$) of a pycnometer with a bypass line having an internal volume of approximately 40 mL was precisely measured.
Next, after a sample cut to approximately 2 mm×2 mm was placed flat at the bottom of the pycnometer so as to have a thickness of approximately 10 mm, the mass ($m_2$) was precisely measured.
Then, 1-butanol was slowly added to the pycnometer to a depth of approximately 20 mm from the bottom.
Next, the pycnometer was gently oscillated, and after it was confirmed that no large air bubbles were formed, the pycnometer was placed in a vacuum desiccator and gradually evacuated to a pressure of 2.0 to 2.7 kPa.
The pressure was maintained for 20 minutes or longer, and after the generation of air bubbles stopped, the bottle was removed and further filled with 1-butanol. After a stopper was inserted, the pycnometer was immersed in a constant-temperature bath (adjusted to 30.0±0.03° C.) for at least 15 minutes, and the liquid surface of 1-butanol was aligned with the marked line.
Thereafter, the pycnometer was removed, and after the outside of the pycnometer was thoroughly wiped and the pycnometer was cooled to room temperature, the mass ($m_4$) was precisely measured.
Next, the same pycnometer was filled with 1-butanol and immersed in a constant-temperature water bath in the same manner as described above. After the marked line was aligned, the mass ($m_3$) was measured.
In addition, distilled water which was boiled immediately before use and from which the dissolved gas was removed was placed in the pycnometer and immersed in a constant-temperature water bath in the same manner as described above. After the marked line was aligned, the mass ($m_5$) was measured.
The true density ($\rho_B$) was calculated using the following formula.
This was used as $\rho_{Bt}$.

$$\rho_{Bt} = \frac{m_2 - m_1}{m_2 - m_1 - (m_4 - m_3)} \times \frac{m_3 - m_1}{m_5 - m_1} d \quad \text{[Mathematical Formula 3]}$$

(Where, d is the specific gravity (0.9946) in water at 30° C.)
Note that the true density of carbon fibers can also be measured by this method.

True Density by Density Gradient Tube Technique
True density was measured according to the density gradient tube technique of the carbon fiber density test method (JIS R7603-1999).

By this method, the non-graphitizable carbon, graphitizable carbon, and graphite contained in the carbonaceous molded articles obtained in Working Examples 1 to 4 can be separated and identified.

Porosity of Carbonaceous Molded Article

The porosity $\varepsilon$ of the carbonaceous molded article was determined by the following formula from the above bulk density $\rho_B$ and the true density $\rho_T$ determined by the pycnometer method using butanol.

Furthermore, when the molded article is constituted of a mixture of substances having different true densities, the weighted average value of true density of the substances that constitute the molded article may be used as the true density of the molded article.

$$\varepsilon = \left(1 - \frac{\rho_B}{\rho_T}\right) \times 100 \quad \text{[Mathematical Formula 4]}$$

Volatile Content

Approximately 1 g of sample was collected in a dried crucible, and after drying for 30 min at 105° C. in a non-oxidizing gas atmosphere, it was allowed to cool to room temperature in a dry desiccator, and the dry mass of the sample in the crucible was measured.

Then, the crucible was placed in an electric furnace, and heated in the electric furnace to 800° C. at a heating rate of 10° C./min while nitrogen flowed at a rate of 20 L/min, and then ignited at 800° C. for 1 hour. The crucible was then allowed to cool to room temperature in a nitrogen atmosphere and the volatile content was removed. The mass of the sample was then measured, and the volatile content was calculated using the following formula.

$$VM = \frac{W_2 - W_3}{W_2 - W_1} \times 100 \quad \text{[Mathematical Formula 5]}$$

Mass of crucible: $W_1$
Mass of crucible and sample after drying: $W_2$
Mass of crucible and sample after ignition: $W_3$
Volatile content: VM Measurement of Combustion Temperature by Differential Thermal Analysis Combustion temperature can be measured by differential thermal analysis in the following manner.

Differential thermal analysis is performed under dry air flow using a DTG-50 manufactured by Shimadzu Corporation. The analysis conditions are 2 mg of sample, air flow of 100 mL/min, and heating rate of 10° C./min.

The exothermic peak temperature can be read from the differential heating curve. The combustion temperature of the sample was determined from the obtained exothermic peak temperature.

Average Interlayer Spacing $d_{002}$ by X-Ray Diffraction

A sample holder is filled with carbon material powder, and an X-ray diffraction pattern is obtained by using CuKα rays monochromatized by a Ni filter as a radiation source. The peak position of the diffraction pattern is determined by the method of elastic center (method of determining the center of gravity position of diffraction lines and determining the peak position with a corresponding value of 2θ), and this is corrected using a diffraction peak of the (111) plane of a high-purity silicone powder used as a reference substance. The wavelength of the CuKα rays is set to 0.15418 nm, and $d_{002}$ is calculated by Bragg's equation.

$$d_{002} = \frac{\lambda}{2 \cdot \sin\theta} \quad \text{[Mathematical Formula 6]}$$

Calculation of $L_{C(002)}$ by X-Ray Diffraction $L_{C(002)}$ is calculated by substitution into the Scherrer equation.

$$L_{C(002)} = \frac{K \cdot \lambda}{\beta \cdot \cos\theta} \quad \text{[Mathematical Formula 7]}$$

K: Form factor (0.9),
$\lambda$: Wavelength of X-rays (CuK$_{\alpha m}$=0.15418 nm),
θ: Diffraction angle
$\beta$: Half-width of 002 diffraction peak (2θ at which peak width corresponds to location of half intensity)

Average Particle Size as Determined by Laser Diffraction

Three drops of a dispersant (cationic surfactant, "SN-WET 366" (manufactured by San Nopco Limited)) were added to approximately 0.01 g of a sample, and the dispersant was blended into the sample.

Next, 30 mL of pure water was added, and after the pure water was dispersed for approximately 2 minutes with an ultrasonic washer, the particle size distribution within the particle size range of 0.5 to 3000 μm was determined with a particle size distribution measurement device ("SALD-3000S" manufactured by Shimadzu Corporation).

The refractive index of the particle was assumed to be 2.0 to 0.1i.

The average particle size $Dv_{50}$ (μm) was determined from the resulting particle size distribution as the particle size yielding a cumulative volume of 50%.

Pore Volume by Mercury Penetration Method

Pore volume can be measured using a mercury porosimeter (for example, Autopore IV 9500 manufactured by Micromeritics Corp.).

The carbonaceous molded article is put in a sample container, and degassed for 30 minutes under a pressure of not greater than 2.67 Pa.

Then, mercury is introduced into the sample container, pressure is gradually increased, and the mercury penetrates into the pores of the carbonaceous molded article sample (maximum pressure: 414 MPa).

From the relationship between pressure and mercury penetration quantity at this time, the pore volume distribution of the carbonaceous molded article is measured using the calculation formulas below.

Specifically, the volume of mercury that penetrates the carbonaceous molded article is measured from a pressure equivalent to pore diameter 89 μm (0.01 MPa) to the maximum pressure (414 MPa, equivalent to pore diameter 3 nm).

In the calculation of pore diameter, when mercury penetrates into the pores of a cylinder having a diameter (D) at a pressure (P), and the surface tension of mercury is taken as "γ" and the contact angle between mercury and the pore wall is taken as "0," the following equation holds true:

$$-\pi D \gamma \cos\theta = \pi (D/2)2 \cdot P$$

Therefore, $$D = (-4\gamma \cos\theta)/P$$

In the present specification, the surface tension of mercury is taken as 484 dyne/cm and the contact angle between mercury and carbon is taken as 130 degrees. When the pressure P is expressed in MPa and the pore diameter D is expressed in μm, the relationship between the pressure P and the pore diameter D is determined by using the following formula:

$$D=1.27/P$$

For example, the pore volume in the range of pore diameter of 0.05 to 100 μm is equivalent to the volume of mercury that penetrates at mercury penetration pressure from 1.27 MPa to 63.5 MPa.

Manufacturing Example 1

In this manufacturing example, a non-graphitizable carbonaceous material precursor was manufactured.
First, 70 kg of a petroleum-based pitch with a softening point of 205° C. and an H/C atomic ratio of 0.65 and 30 kg of naphthalene were loaded into a pressure-resistant container with an internal volume of 300 L and having a mixing impeller and an outlet nozzle, and after the substances were melted and mixed while heating at 190° C., the mixture was cooled to 80 to 90° C. The inside of the pressure-resistant container was pressurized by nitrogen gas, and the content was extruded from the outlet nozzle to obtain a string-shaped compact with a diameter of approximately 500 μm. Next, this string-shaped compact was pulverized so that the ratio (L/D) of the diameter (D) and the length (L) was approximately 1.5, and the resulting fractured product was added to an aqueous solution in which 0.53 wt % of polyvinyl alcohol (degree of saponification: 88%) heated to 93° C. was dissolved, dispersed while stirring, and cooled to obtain a spherical pitch compact slurry.
After most of the water was removed by filtration, the naphthalene in the pitch molded articles was extracted with n-hexane in a quantity of 6 times the weight of the spherical pitch molded articles.
The porous spherical pitch obtained in this way was heated to 270° C. while circulating heated air using a fluidized bed and oxidized while being held for 1 hour at 270° C. so as to obtain a carbon precursor A.

Manufacturing Example 2

In this manufacturing example, a graphitizable carbonaceous material precursor was manufactured.
First, 68 kg of a petroleum pitch having a softening point of 210° C., a quinoline insoluble content of 1 wt %, and an H/C atomic ratio of 0.63% and 32 kg of naphthalene were loaded into a pressure-resistant vessel having a mixing impeller and an internal volume of 300 L. After the substances were dissolved and mixed while heating at 190° C., the mixture was cooled to 80 to 90° C. and extruded to form a string-like compact with a diameter of approximately 500 μm.
Next, this string-shaped compact was pulverized so that the ratio of the diameter and the length was approximately 1.5, and the resulting pulverized material was dropped in a 0.53% polyvinyl alcohol aqueous solution (degree of saponification: 88%) heated to 93° C., and dispersed while stirring and then cooled to form a spherical pitch compact.
After most of the water was removed by filtration, the naphthalene in the pitch compact was extracted with n-hexane in a weight approximately 6 times that of the spherical pitch compact.
The spherical pitch porous article obtained as described above was subjected to oxidation treatment while passing the sample through heated air and maintaining the product at 165° C. for 1 hour, and a carbon precursor B was produced.

Manufacturing Example 3

The carbon precursor B obtained in the above Manufacturing Example 2 was heat treated for 1 hour at 480° C. in a nitrogen atmosphere, and a carbon precursor C was obtained.
This carbon precursor was pulverized to form carbon precursor fine particles having an average particle size of approximately 12 μm.

Working Example 1

In this working example, a carbonaceous molded article for electrodes was manufactured using a carbon precursor A obtained in Manufacturing Example 1 as an anode active material.
Kureka Paper (E-104, manufactured by Kureha Corporation) was heat treated for 4 hours at 250° C. in a nitrogen atmosphere, to make a carbon fiber nonwoven fabric for active material impregnation.
Thereafter, 0.3 g of water-soluble modified cellulose (trade name Metolose 90SH-4000, manufactured by Shin-Etsu Chemical Co., Ltd.) was put into 22 mL of deionized water, and 6 mL of alcohol (Solmix AP7, manufactured by Japan Alcohol Trading Co., Ltd.) was mixed in, to prepare an alcohol aqueous solution.
20 g of carbon precursor A was mixed with 28 mL of this alcohol aqueous solution for 5 minutes, to prepare a slurry for active material impregnation.
The carbon fiber nonwoven fabric was impregnated with the above slurry for active material impregnation using a doctor blade.
The weight after impregnation for the carbon precursor A was 81 wt % and the weight after impregnation for the carbon fiber paper was 19 wt %.
The impregnated nonwoven fabric was dried at 120° C. This active material impregnated nonwoven fabric was cut as appropriate, and this molded article was heat treated for 1 hour at 1200° C. in a nitrogen atmosphere, to produce an active material molded article 1.
Physical properties of the active material molded article are shown in Table 1. Furthermore, the pore volume of pores 0.05 to 100 μm in diameter of the active material molded article 1 was 0.811 mL/g.

Working Example 2

In this working example, a carbonaceous molded article for electrodes was manufactured using a carbon precursor A and carbon precursor C as anode active materials.
The operations of Working Example 1 were repeated except that 46 wt % of carbon precursor A, 35 wt % of carbon precursor C, and 19 wt % of carbon fiber paper were used, to produce a carbonaceous molded article 2.
Physical properties of the resulting carbonaceous molded article 2 are shown in Table 1.

Working Example 3

In this working example, a carbonaceous molded article for electrodes was manufactured using a carbon precursor A, carbon precursor C, and graphite as anode active materials.
The operations of Working Example 1 were repeated except that 20 wt % of carbon precursor A, 64 wt % of carbon precursor C, and 16 wt % of carbon fiber paper were used, to produce a carbonaceous molded article 3.
Physical properties of the resulting carbonaceous molded article 2 are shown in Table 1.
Furthermore, the pore volume of pores 0.05 to 100 μm in diameter of the active material molded article 3 was 0.749 mL/g.

Working Example 4

In this working example, a carbonaceous molded article for electrodes was manufactured using a carbon precursor A and carbon precursor C as anode active materials.
The operations of Working Example 1 were repeated except that 56 wt % of carbon precursor A, 20 wt % of carbon precursor C, 7 wt % of graphite, and 17 wt % of carbon fiber paper were used, to produce a carbonaceous molded article 4.
Physical properties of the resulting carbonaceous molded article 3 are shown in Table 1.

Working Example 5

In this working example, the operations of Working Example 1 were repeated except that an active material impregnated nonwoven fabric of the same composition as Working Example 1 was cut to a size of 5 cm×5 cm and three layers were laminated, and this was pressed at 380° C. and 5 MPa, to produce a carbonaceous molded article 5. Physical properties of the resulting carbonaceous molded article 5 are shown in Table 1.

Comparative Example 1

A carbonaceous molded article for electrodes for non-aqueous electrolyte secondary batteries was manufactured using furan resin carbon as an anode active material. Furan resin (Hitafuran VF-303 by Hitachi Chemical Company) was poured into an aluminum cup and cured by heating for 1 day at 70° C. and for another 1 day at 170° C. under reduced pressure.
The obtained sheet-like furan resin was heat treated for 1 hour at 1200° C. in a nitrogen atmosphere.
Physical properties of the obtained active material molded article are shown in Table 1.

TABLE 1-II

| | Thickness (mm) | Bulk density (g/cm$^3$) | Butanol true density (g/cm$^3$) | Porosity (%) | Specific surface area (m$^2$/g) | DTA (° C.) | H/C |
|---|---|---|---|---|---|---|---|
| Working Example 1 | 0.30 | 0.45 | 1.53 | 64 | 1 | 634 | 0.01 |
| Working Example 2 | 0.28 | 0.62 | 1.65 | 63 | 1 | 637 705 | 0.01 |
| Working Example 3 | 0.37 | 0.60 | 1.76 | 66 | 1 | 643 709 | 0.01 |
| Working Example 4 | 0.32 | 0.55 | 1.72 | 68 | 1 | 639 703 744 | 0.01 |
| Working Example 5 | 0.40 | 0.95 | 1.53 | 38 | 1 | 635 | 0.01 |
| Comparative Example 1 | 0.23 | 1.17 | 1.52 | 23 | 0.04 | 663 | 0.01 |

Working Example 6

In this working example, a carbonaceous molded article for electrodes was manufactured using a graphitizable carbonaceous material precursor as an anode active material.
Kureka Paper (E-104, manufactured by Kureha Corporation) was heat treated for 4 hours at 250° C. in a nitrogen atmosphere, to make a carbon fiber nonwoven fabric for active material impregnation.
Thereafter, 0.3 g of water-soluble modified cellulose (trade name Metolose 90SH-4000, manufactured by Shin-Etsu Chemical Co., Ltd.) was put into 22 mL of deionized water, and 6 mL of alcohol (Solmix AP7, manufactured by Japan Alcohol Trading Co., Ltd.) was mixed thereto, to prepare an alcohol aqueous solution.
Then, 19 g of carbon precursor C (average particle size 10 μm) obtained in Manufacturing Example 3 containing 15 wt % of volatile content was added to and mixed with 28 mL of this alcohol aqueous solution for 5 minutes.
A slurry for active material impregnation was prepared.
The carbon fiber nonwoven fabric was impregnated with the above slurry for active material impregnation using a doctor blade.
The weight after impregnation for carbon precursor C was 83 wt % and the weight after impregnation for the carbon fiber paper was 17 wt %.
The impregnated nonwoven fabric was dried at 120° C.
This active material impregnated nonwoven fabric was cut as appropriate, and this molded article was heat treated for

TABLE 1-I

| | Precursor composition (wt %) | | | Carbonaceous molded article composition (wt %) | | | |
|---|---|---|---|---|---|---|---|
| | Carbon precursor A | Carbon precursor C | Graphite | Carbon fiber paper | Carbon A | Carbon C | Graphite | Carbon fiber paper |
| Working Example 1 | 81 | | 0 | 19 | 82 | | | 18 |
| Working Example 2 | 46 | 35 | 0 | 19 | 47 | 35 | | 18 |
| Working Example 3 | 20 | 64 | 0 | 16 | 20 | 62 | | 18 |
| Working Example 4 | 56 | 20 | 7 | 17 | 53 | 22 | 10 | 15 |
| Working Example 5 Comparative Example 1 | 81 | | | 19 | 82 | | | 18 |

1 hour at 1200° C. in a nitrogen atmosphere, to produce an active material molded article 6.
Physical properties of the active material molded article are shown in Table 2.

Working Example 7

In this working example, a carbonaceous molded article for electrodes was manufactured using carbon fiber paper as a carbon fiber nonwoven fabric and using graphitizable carbonaceous material precursor particles and graphite particles as anode active materials.
Kureka Paper (E-104, manufactured by Kureha Corporation) was heat treated for 4 hours at 250° C. in a nitrogen atmosphere, to make a carbon fiber nonwoven fabric for active material impregnation.
Thereafter, 20 L of deionized water and 5 L of alcohol (Solmix AP7, manufactured by Japan Alcohol Trading Co., Ltd.) were mixed, to prepare an alcohol aqueous solution. Then, 3.45 kg of carbon precursor B was added to 17 L of the above alcohol aqueous solution and mixed with a pulverizing stirrer (attritor model MA-15 SE, manufactured by Mitsui Miike Machinery Co., Ltd.) for 5 minutes.
Additionally, 9 kg of carbon precursor C (average particle size 10 μm), 5.4 kg of graphite (PAG-5, manufactured by Nippon Graphite Industries Co., Ltd.), 240 g of water-soluble modified cellulose (trade name Metolose 90SH-4000, manufactured by Shin-Etsu Chemical Co., Ltd.), and 8 L of alcohol aqueous solution were added to the obtained mixture, to prepare a slurry for active material impregnation. The above slurry for active material impregnation was loaded into an impregnation solution storage tank.
A carbon fiber nonwoven fabric wound into a roll was fed from a supply roll to the impregnation storage tank at a rate of 1.2 m/min by rollers, and the carbon fiber nonwoven fabric was impregnated with the slurry for active material impregnation. The above active material impregnated carbon fiber nonwoven fabric was passed through and dried while sandwiched by far infrared ray apparatuses (Nikko far infrared Neogunite, 200 V, 4.8 kVA).
After this active material impregnated carbon fiber nonwoven fabric was cut as appropriate, it was molded, to produce a molded article.
This molded article was heat treated for 1 hour at 1200° C. in a nitrogen atmosphere, to produce an active material molded article 7.
Physical properties of the active material molded article are shown in Table 2. Furthermore, the pore volume of pores 0.05 to 100 μm in diameter of the active material molded article 7 was 0.598 mL/g, and the pore volume of pores 0.01 to 0.05 μm in diameter was 0.001 mL/g.
The pore volume of pores 0.05 to 100 μm in diameter correlates highly with the porosity, and as the porosity increases, the pore volume of pores 0.05 to 100 μm in diameter also increases.

Working Example 8

In this working example, a carbonaceous molded article for electrodes was prepared by compression molding using carbon fiber paper as a carbon fiber nonwoven fabric and using graphitizable carbonaceous material precursor particles and graphite particles as anode active materials.
The operations of Working Example 7 were repeated except that molding was performed by compression molding.
Compression molding was performed as follows.
The active material impregnated carbon fiber nonwoven fabric obtained in Working Example 2 was cut to a size of 87 cm×87 cm and two layers were laminated. The fabric was pressed at a pressure of 0.03 MPa, and heated to 400° C. in a non-oxidizing gas atmosphere.
Then, the temperature was raised to 600° C. and it was heated for 1 hour under a pressure of 2.5 to 3.8 MPa in a non-oxidizing gas atmosphere.
After the pressure was returned to atmospheric pressure and the temperature was cooled to room temperature, it was heat treated for 1 hour at 1200° C. in a nitrogen atmosphere to produce an active material molded article 8.
Physical properties of the active material molded article are shown in Table 2.

Working Example 9

In this working example, a carbonaceous molded article for electrodes was prepared by compression molding and heat treatment at high temperature using carbon fiber paper as a carbon fiber nonwoven fabric and using graphitizable carbonaceous material precursor particles and graphite particles as anode active materials.
The operations of Working Example 8 were repeated except that four layers were laminated and heat treatment was performed at 2000° C., to produce an active material molded article 9.
Physical properties of the active material molded article are shown in Table 2.

TABLE 2-I

| | Precursor composition (wt %) | | | | Carbonaceous molded article composition (wt %) | | | |
|---|---|---|---|---|---|---|---|---|
| | Carbon precursor B | Carbon precursor C | Graphite | Carbon fiber paper | Carbon B | Carbon C | Graphite | Carbon fiber paper |
| Working Example 6 | | 83 | | 17 | | 86 | | 14 |
| Working Example 7 | 16 | 43 | 26 | 15 | 13 | 44 | 32 | 11 |
| Working Example 8 | 16 | 43 | 26 | 15 | 13 | 44 | 32 | 11 |
| Working Example 9 | 16 | 43 | 26 | 15 | 13 | 44 | 32 | 11 |

TABLE 2-II

| | Thickness (mm) | Bulk density (g/cm³) | Butanol true density (g/cm³) | Porosity (%) | Specific surface area (m²/g) | DTA (° C.) | H/C |
|---|---|---|---|---|---|---|---|
| Working Example 6 | 0.31 | 0.68 | 1.86 | 63 | 1 | 684 733 | 0.01 |
| Working Example 7 | 0.34 | 0.73 | 1.91 | 62 | 1 | 666 719 | 0.01 |
| Working Example 8 | 0.40 | 1.25 | 1.91 | 35 | 1 | 670 725 | 0.01 |
| Working Example 9 | 0.65 | 1.28 | 1.99 | 36 | 1 | 753 807 | 0.01 |

Working Example 10

In this working example, a carbonaceous molded article for electrodes was manufactured using a graphitizable carbonaceous material precursor and Si (metal capable of lithium doping and dedoping) as anode active materials.

Kureka Paper (E-104, manufactured by Kureha Corporation) was heat treated for 4 hours at 250° C. in a nitrogen atmosphere, to make a carbon fiber nonwoven fabric for active material impregnation.

Thereafter, 20 L of deionized water and 5 L of alcohol (Solmix AP7, manufactured by Japan Alcohol Trading Co., Ltd.) were mixed to prepare an alcohol aqueous solution. Next, 3.7 kg of carbon precursor B obtained in Manufacturing Example 2, 9 kg of carbon precursor C (average particle size 10 μm) obtained in Manufacturing Example 3, and 1 kg of Si were added to 17 L of the above alcohol aqueous solution and mixed with a pulverizing stirrer (attritor model MA-15 SE, manufactured by Mitsui Miike Machinery Co., Ltd.) for 5 minutes.

Additionally, 240 g of water-soluble modified cellulose (trade name Metolose 90SH-4000, manufactured by Shin-Etsu Chemical Co., Ltd.), and 8 L of alcohol aqueous solution were added, to prepare a slurry for active material impregnation.

The above slurry for active material impregnation was loaded into an impregnation solution storage tank.

A carbon fiber nonwoven fabric wound into a roll was fed from the supply roll to the impregnation storage tank at a rate of 1.2 m/min using rollers, and the carbon fiber nonwoven fabric was impregnated with the slurry for active material impregnation. The above active material impregnated carbon fiber nonwoven fabric was passed through and dried while sandwiched by far infrared ray apparatuses (Nikko far infrared Neogunite, 200 V, 4.8 kVA).

After this active material impregnated carbon fiber nonwoven fabric was cut as appropriate, it was molded, to produce a molded article.

This molded article was heat treated for 1 hour at 1100° C. in a nitrogen atmosphere, to produce an active material molded article 10.

Physical properties of the active material molded article are shown in Table 3.

Working Example 11

In this working example, a carbonaceous molded article for electrodes was manufactured using a carbon precursor B, carbon precursor C, and Si as anode active materials.

The operations of Working Example 10 were repeated except that 22 wt % of carbon precursor B, 48 wt % of carbon precursor C, 12 wt % of Si, and 18 wt % of carbon fiber paper were used, to produce a carbonaceous molded article 11.

Physical properties of the resulting carbonaceous molded article 2 are shown in Table 3.

Working Example 12

In this working example, a carbonaceous molded article for electrodes was manufactured using a carbon precursor B, carbon precursor C, and Si as anode active materials.

The operations of Working Example 10 were repeated except that 22 wt % of carbon precursor B, 59 wt % of carbon precursor C, 2 wt % of Si, and 18 wt % of carbon fiber paper were used, to produce a carbonaceous molded article 12.

Physical properties of the resulting carbonaceous molded article 12 are shown in Table 3.

Working Example 13

In this working example, a carbonaceous molded article for electrodes was manufactured using a carbon precursor B, carbon precursor C, and $SnO_2$ as anode active materials.

The operations of Working Example 10 were repeated except that 22 wt % of carbon precursor B, 54 wt % of carbon precursor C, 6 wt % of $SnO_2$, and 18 wt % of carbon fiber paper were used, to produce a carbonaceous molded article 13.

Physical properties of the resulting carbonaceous molded article 13 are shown in Table 3.

Working Example 14

The active material impregnated carbon fiber nonwoven fabric obtained in Working Example 13 was cut to a size of 5 cm×5 cm, and three layers were laminated. The operations of Working Example 13 were repeated except that the fabric was pressured at 3 MPa at 350° C., to produce a carbonaceous molded article 14. Physical properties of the resulting carbonaceous molded article 14 are shown in Table 3.

Comparative Example 2

NMP was added to 75 parts by mass of Si (metal capable of lithium doping and dedoping), 20 parts by mass of polyvinylidene fluoride, and 5 parts by mass of conductive agent Super-P to make a paste, and this was applied uniformly onto copper foil.

After the sample was dried, the sample was punched from the copper foil into a disc shape with a diameter of 15 mm, and pressed to obtain an electrode.

The amount of Si (metal capable of lithium doping and dedoping) in the electrode was adjusted to approximately 3 mg.

TABLE 3-I

| | Precursor composition (wt %) | | | | | Carbonaceous molded article (wt %) | | | | |
|---|---|---|---|---|---|---|---|---|---|---|
| | Carbon precursor C | Carbon precursor B | Si | SnO$_2$ | Carbon fiber paper | Carbon C | Carbon B | Si | SnO$_2$ | Carbon fiber paper |
| Working Example 10 | 58 | 18 | 9 | | 15 | 54 | 22 | 6 | | 18 |
| Working Example 11 | 48 | 22 | 12 | | 18 | 52 | 18 | 15 | | 15 |
| Working Example 12 | 58 | 22 | 2 | | 18 | 64 | 18 | 3 | | 15 |
| Working Example 13 | 54 | 22 | | 6 | 18 | 59 | 18 | | 8 | 15 |
| Working Example 14 | 54 | 22 | | 6 | 18 | 59 | 18 | | 8 | 15 |

TABLE 3-II

| | Thickness (mm) | Bulk density (g/cm$^3$) | Butanol true density (g/cm$^3$) | Porosity (%) | Specific surface area (m$^2$/g) | H/C |
|---|---|---|---|---|---|---|
| Working Example 10 | 0.32 | 0.60 | 1.83 | 67 | 1 | 0.03 |
| Working Example 11 | 0.34 | 0.62 | 1.94 | 66 | 1 | 0.02 |
| Working Example 12 | 0.35 | 0.62 | 1.89 | 67 | 1 | 0.03 |
| Working Example 13 | 0.33 | 0.63 | 1.89 | 66 | 1 | 0.02 |
| Working Example 14 | 0.38 | 1.00 | 1.89 | 53 | 1 | 0.02 |

Anodes and non-aqueous electrolyte secondary batteries were produced by the following operations (a) and (b) using the carbonaceous molded articles 1 to 14 and the active materials obtained in Working Examples 1 to 14 and Comparative Examples 1 and 2, and the electrode performance thereof was evaluated.

The results are shown in Table 4.

(a) Production of Test Battery

Although the carbonaceous molded article of the present invention is suitable for forming an anode for a non-aqueous electrolyte secondary battery. In order to precisely evaluate the discharge capacity (dedoping capacity) and the irreversible capacity (non-dedoping capacity) of the battery active material without being affected by fluctuation in the performance of the counter electrode, a lithium secondary battery was formed using an electrode obtained by punching the above obtained carbonaceous molded article into a disc with a diameter of 15 mm, together with a counter electrode comprising lithium metal with stable characteristics, and the characteristics thereof were evaluated.

The lithium electrode was prepared inside a glove box in an Ar atmosphere.

An electrode (counter electrode) was formed by spot-welding a stainless steel mesh disc with a diameter of 16 mm on the outer lid of a 2016 coin type test cell in advance, punching a thin sheet of metal lithium with a thickness of 0.8 mm into a disc shape with a diameter of 15 mm, and pressing the thin sheet of metal lithium into the stainless steel mesh disc.

Using a pair of electrodes produced in this way, LiPF$_6$ was added at a proportion of 1.4 mol/L to a mixed solvent prepared by mixing ethylene carbonate, dimethyl carbonate, and methyl ethyl carbonate at a volume ratio of 1:2:2 as an electrolyte solution. A polyethylene gasket was used as a fine porous membrane separator made of borosilicate glass fibers with a diameter of 19 mm to assemble a 2016 coin type non-aqueous electrolyte lithium secondary battery in an Ar glove box.

(b) Measurement of Battery Capacity

Charge-discharge tests were performed on a lithium secondary battery with the configuration described above using a charge-discharge tester ("TOSCAT" manufactured by Toyo System Co., Ltd.).

A lithium doping reaction for doping lithium into the carbon electrode was performed with a constant-current/constant-voltage method, and a dedoping reaction was performed by a constant-current method.

Here, in a battery comprising a lithium chalcogen compound for the cathode, the doping reaction for doping lithium into the carbon electrode is called "charging", and in a battery comprising lithium metal for a counter electrode, as in the test battery of the present invention, the doping reaction for the carbon electrode is called "discharging". The manner in which the doping reactions for doping lithium into the same carbon electrode thus differs depending on the pair of electrodes used. Therefore, the doping reaction for doping lithium into the carbon electrode will be described as "charging" hereafter for the sake of convenience.

Conversely, "discharging" refers to a charging reaction in the test battery but is described as "discharging" for the sake of convenience since it is a dedoping reaction for removing lithium from the carbon material.

The charging method used here is a constant-current/constant-voltage method. Specifically, constant-current charging was performed at 0.5 mA/cm$^2$ until the terminal voltage reached 0 mV. After the terminal voltage reached 0 mV, constant-voltage charging was performed at a terminal voltage of 0 mV, and charging was continued until the current value reached 20 μA.

At this time, a value determined by dividing the electricity supply by the mass of the carbon material of the electrode is defined as the charge capacity per unit mass of the carbon material (mAh/g).

After the completion of charging, the battery circuit was opened for 30 minutes, and discharging was performed thereafter.

Discharging was performed at a constant current of 0.5 mA/cm$^2$ until the final voltage reached 1.5 V.

At this time, a value determined by dividing the electrical discharge by the mass of the carbon material of the electrode is defined as the discharge capacity per unit mass of the carbon material (mAh/g).

The irreversible capacity was calculated as the discharge capacity subtracted from the charge capacity.

The charge/discharge capacities and irreversible capacity were determined by averaging three measurements for test batteries produced using the same sample. Battery characteristics are shown in Table 2.

TABLE 4

| | Charge capacity (mAh/g) | Discharge capacity (mAh/g) | Irreversible capacity (mAh/g) | Efficiency (%) | Discharge capacity X bulk density (mAh/cm³) |
|---|---|---|---|---|---|
| Working Example 1 | 482 | 428 | 54 | 89 | |
| Working Example 2 | 427 | 380 | 47 | 89 | |
| Working Example 3 | 353 | 319 | 34 | 90 | |
| Working Example 4 | 423 | 381 | 42 | 90 | |
| Working Example 5 | 414 | 387 | 27 | 93 | |
| Comparative Example 1 | 298 | 196 | 102 | 66 | |
| Working Example 6 | 350 | 318 | 32 | 91 | 403 |
| Working Example 7 | 395 | 364 | 30 | 92 | 506 |
| Working Example 8 | 357 | 333 | 24 | 93 | 795 |
| Working Example 9 | 242 | 233 | 9 | 96 | 893 |
| Working Example 10 | 695 | 607 | 88 | 87 | |
| Working Example 11 | 874 | 763 | 111 | 87 | |
| Working Example 12 | 432 | 379 | 54 | 87 | |
| Working Example 13 | 407 | 378 | 29 | 93 | |
| Working Example 14 | 364 | 339 | 24 | 93 | |
| Comparative Example 2 | 2542 | 1010 | 1532 | 40 | |

As shown in Table 4, the non-aqueous electrolyte secondary batteries comprising the carbonaceous molded articles of Working Examples 1 to 5 as anodes exhibited high charge/discharge capacity and high efficiency.
On the other hand, the non-aqueous electrolyte secondary battery comprising the carbonaceous molded article obtained in Comparative Example 1 as an anode had low charge/discharge capacity and high irreversible capacity, and therefore had extremely poor efficiency.
This is thought to be because the porosity was a low 23%.
The non-aqueous electrolyte secondary batteries comprising the carbonaceous molded articles obtained in Working Examples 6 to 8 as anodes exhibited high efficiency.
Furthermore, the non-aqueous electrolyte secondary battery comprising the carbonaceous molded article obtained in Working Example 9 as an anode had low irreversible capacity and exhibited extremely high efficiency.
Additionally, the non-aqueous electrolyte secondary batteries comprising the carbonaceous molded articles of the present invention as anodes exhibited high discharge capacity per unit volume.
The non-aqueous electrolyte secondary batteries comprising the carbonaceous molded articles and Si obtained in Working Examples 10 to 12 as anodes exhibited high charge/discharge capacity and efficiency.
On the other hand, the non-aqueous electrolyte secondary battery comprising Si obtained in Comparative Example 1 had high irreversible capacity, and therefore had poor efficiency.

Furthermore, the non-aqueous electrolyte secondary batteries comprising the carbonaceous molded articles and $SnO_2$ obtained in Working Examples 13 and 14 as anodes exhibited low irreversible capacity and high efficiency.

INDUSTRIAL APPLICABILITY

The non-aqueous electrolyte secondary battery comprising the carbonaceous molded article of the present invention is excellent in irreversible capacity and efficiency. Therefore, the non-aqueous electrolyte secondary battery can be used in vehicular applications such as hybrid vehicles (HEV) and electric vehicles (EV), in which long life and high input/output characteristics are required.
Furthermore, the present specification discloses:
[1] A carbonaceous molded article for electrodes comprising a carbon fiber nonwoven fabric, the article having a thickness of not greater than 1 mm, a true density of not less than 1.4 and less than 1.85 g/cm³, an atomic ratio (H/C) of hydrogen atoms and carbon atoms according to elemental analysis of not greater than 0.1, a porosity determined from a bulk density and a butanol true density of 25 to 80%, and a volatile content of not greater than 5.0 wt %;
[2] The carbonaceous molded article for electrodes according to [1], wherein at least one combustion peak is observed at not higher than 760° C. as measured by a differential thermal analyzer;
[3] The carbonaceous molded article for electrodes according to [1] or [2], wherein the article comprises non-graphitizable carbon;
[4] The carbonaceous molded article for electrodes according to any one of [1] to [3], wherein carbon fibers of the carbon fiber nonwoven fabric have an isotropic structure;
[5] An electrode for batteries comprising the carbonaceous molded article for electrodes described in any one of [1] to [4];
[6] A non-aqueous electrolyte secondary battery comprising the electrode for batteries described in [5];
[7] A method of manufacturing a carbonaceous molded article for electrodes, the method comprising: (1) an impregnation step of impregnating a carbon fiber nonwoven fabric with a slurry containing a non-graphitizable carbonaceous material precursor dispersed in an aqueous solvent, and obtaining an anode active material precursor impregnated carbon fiber nonwoven fabric, (2) a molding step of molding the anode active material precursor impregnated carbon fiber nonwoven fabric, and obtaining a molded article, and (3) a heat treatment step of heat treating the molded article at 1000° C. to 2000° C. in a non-oxidizing gas atmosphere;
[8] The method of manufacturing a carbonaceous molded article for electrodes according to [7], wherein the molded article in the molding step (2) is obtained by compression molding; or
[9] The method of manufacturing a carbonaceous molded article for electrodes according to [7] or [8], wherein carbon fibers of the carbon fiber nonwoven fabric have an isotropic structure.
Additionally, the present specification discloses:
[1] A carbonaceous molded article for electrodes comprising a carbon fiber nonwoven fabric, the article having a thickness of not greater than 1 mm, a true density of 1.85 to 2.20 g/cm³, an atomic ratio (H/C) of hydrogen atoms and carbon atoms according to elemental analysis of not greater than 0.1, a porosity determined from a bulk density and a butanol true density of 25 to 80%, and a volatile content of not greater than 5.0 wt %;

[2] The carbonaceous molded article for electrodes according to [1], wherein at least one combustion peak is observed at not higher than 760° C. as measured by a differential thermal analyzer;
[3] The carbonaceous molded article for electrodes according to [1] or [2], wherein the article comprises graphitizable carbon;
[4] The carbonaceous molded article for electrodes according to any one of [1] to [3], wherein carbon fibers of the carbon fiber nonwoven fabric have an isotropic structure;
[5] An electrode for batteries comprising the carbonaceous molded article for electrodes described in any one of [1] to [4];
[6] A non-aqueous electrolyte secondary battery comprising the electrode for batteries described in [5];
[7] A method for manufacturing a carbonaceous molded article for electrodes, the method comprising: (1) an impregnation step of impregnating a carbon fiber nonwoven fabric with a slurry containing a graphitizable carbonaceous material precursor dispersed in an aqueous solvent, and obtaining an anode active material precursor impregnated carbon fiber nonwoven fabric, (2) a molding step of molding the anode active material precursor impregnated carbon fiber nonwoven fabric, and obtaining a molded article, and (3) a heat treatment step of heat treating the molded article at 1000° C. to 2000° C. in a non-oxidizing gas atmosphere;
[8] The method for manufacturing a carbonaceous molded article for electrodes according to [7], wherein the molded article in the molding step (2) is obtained by compression molding; or
[9] The method for manufacturing a carbonaceous molded article for electrodes according to [7] or [8], wherein carbon fibers of the carbon fiber nonwoven fabric have an isotropic structure.

Furthermore, the present specification discloses:
[1] A carbonaceous molded article for electrodes comprising one or more anode active materials selected from the group consisting of metals capable of lithium doping and dedoping and metal compounds capable of lithium doping and dedoping, a turbostratic structure carbon, and a carbon fiber nonwoven fabric, the article having a thickness of not greater than 1 mm, an atomic ratio (H/C) of hydrogen atoms and carbon atoms according to elemental analysis of not greater than 0.1, a porosity determined from a bulk density and a butanol true density of 25 to 80%, and a volatile content of not greater than 5.0 wt %;
[2] The carbonaceous molded article for electrodes according to [1], wherein carbon fibers of the carbon fiber nonwoven fabric have an isotropic structure;
[3] An electrode for batteries comprising the carbonaceous molded article for electrodes described in [1] or [2];
[4] A non-aqueous electrolyte secondary battery comprising the electrode for batteries described in [3];
[5] A method of manufacturing a carbonaceous molded article for electrodes, the method comprising: (1) an impregnation step of impregnating a carbon fiber nonwoven fabric with a slurry containing one or more anode active materials selected from the group consisting of metals capable of lithium doping and dedoping and metal compounds capable of lithium doping and dedoping, and a carbonaceous material precursor, dispersed in an aqueous solvent, and obtaining an anode active material precursor impregnated carbon fiber nonwoven fabric, (2) a molding step of molding the anode active material precursor impregnated carbon fiber nonwoven fabric, and obtaining a molded article, and (3) a heat treatment step of heat treating the molded article at 1000° C. to 2000° C. in a non-oxidizing gas atmosphere;
[6] The method of manufacturing a carbonaceous molded article for electrodes according to [5], wherein the molded article in the molding step (2) is obtained by compression molding; or
[7] The method of manufacturing a carbonaceous molded article for electrodes according to [5] or [6], wherein carbon fibers of the carbon fiber nonwoven fabric have an isotropic structure.

The present invention has been described above using specific modes of embodiment, but modifications and improvements apparent to persons having ordinary skill in the art are also included in the scope of the present invention.

The invention claimed is:

1. An active material carbonaceous molded article for an anode for a non-aqueous electrolyte secondary battery,
wherein the article comprises a carbon fiber nonwoven fabric, the article is capable of lithium doping and dedoping, and the article has a thickness of not greater than 1 mm, an atomic ratio (H/C) of hydrogen atoms and carbon atoms according to elemental analysis of not greater than 0.1, a porosity determined from a bulk density and a butanol true density of the molded article of 25 to 80%, and a volatile content of not greater than 5.0 wt %.

2. The active material carbonaceous molded article for an anode for a non-aqueous electrolyte secondary battery according to claim 1, wherein the article comprises non-graphitizable carbon particles.

3. The active material carbonaceous molded article for an anode for a non-aqueous electrolyte secondary battery according to claim 1, wherein the article comprises graphitizable carbon particles.

4. The active material carbonaceous molded article for an anode for a non-aqueous electrolyte secondary battery according to claim 1, wherein the article comprises one or more anode active materials selected from the group consisting of metals capable of lithium doping and dedoping and metal compounds capable of lithium doping and dedoping.

5. The active material carbonaceous molded article for an anode for a non-aqueous electrolyte secondary battery according to claim 1, wherein the article has a true density of 1.4 to 2.20 g/cm$^3$.

6. The active material carbonaceous molded article for an anode for a non-aqueous electrolyte secondary battery according to claim 1, wherein the article has a true density of not less than 1.4 and less than 1.85 g/cm$^3$.

7. The active material carbonaceous molded article for an anode for a non-aqueous electrolyte secondary battery according to claim 1, wherein the article has a true density of 1.85 to 2.20 g/cm$^3$.

8. The active material carbonaceous molded article for an anode for a non-aqueous electrolyte secondary battery according to claim 1, wherein at least one combustion peak is observed at not higher than 760° C. as measured by a differential thermal analyzer.

9. The active material carbonaceous molded article for an anode for a non-aqueous electrolyte secondary battery according to claim 1, wherein carbon fibers of the carbon fiber nonwoven fabric have an isotropic structure.

10. An anode for a non-aqueous electrolyte secondary battery comprising the active material carbonaceous molded article for an anode for a non-aqueous electrolyte secondary battery according to claim 1.

11. A non-aqueous electrolyte secondary battery comprising the anode for a non-aqueous electrolyte secondary battery according to claim 10.

12. A method of manufacturing the active material carbonaceous molded article of claim 1, the method comprising:
  (1) an impregnation step of impregnating a carbon fiber nonwoven fabric with a slurry containing a carbonaceous material precursor dispersed in a solvent, and obtaining an anode active material precursor impregnated carbon fiber nonwoven fabric,
  (2) a molding step of molding the anode active material precursor impregnated carbon fiber nonwoven fabric, and obtaining a molded article, and
  (3) a heat treatment step of heat treating the molded article at 1000° C. to 2000° C. in a non-oxidizing gas atmosphere.

13. A method of manufacturing the active material carbonaceous molded article of claim 1, the method comprising:
  (1) an impregnation step of impregnating a carbon fiber precursor nonwoven fabric with a slurry containing a carbonaceous material precursor dispersed in a solvent, and obtaining an anode active material precursor impregnated carbon fiber precursor nonwoven fabric,
  (2) a molding step of molding the anode active material precursor impregnated carbon fiber precursor nonwoven fabric, and obtaining a molded article, and
  (3) a heat treatment step of heat treating the molded article at 1000° C. to 2000° C. in a non-oxidizing gas atmosphere.

14. The method of manufacturing the active material carbonaceous molded article according to claim 12, wherein the carbonaceous material precursor is at least one selected from the group consisting of a non-graphitizable carbonaceous material precursor and a graphitizable carbonaceous material precursor.

15. The method of manufacturing the active material carbonaceous molded article according to claim 12, wherein the slurry contains one or more anode active materials selected from the group consisting of metals capable of lithium doping and dedoping and metal compounds capable of lithium doping and dedoping.

16. The method of manufacturing the active material carbonaceous molded article according to claim 12, wherein the molded article in the molding step (2) is obtained by compression molding.

17. The method of manufacturing Hall the active material carbonaceous molded article according to claim 12, wherein carbon fibers of the carbon fiber nonwoven fabric have an isotropic structure.

* * * * *